United States Patent [19]

Lobo et al.

[11] Patent Number: 5,781,650
[45] Date of Patent: Jul. 14, 1998

[54] AUTOMATIC FEATURE DETECTION AND AGE CLASSIFICATION OF HUMAN FACES IN DIGITAL IMAGES

[75] Inventors: Niels Lobo; Young Kwon, both of Orlando, Fla.

[73] Assignee: University of Central Florida, Orlando, Fla.

[21] Appl. No.: 922,117

[22] Filed: Aug. 28, 1997

Related U.S. Application Data

[63] Continuation of Ser. No. 448,721, May 25, 1995, abandoned, which is a continuation-in-part of Ser. No. 261,947, Jun. 17, 1994, which is a continuation-in-part of Ser. No. 198,816, Feb. 18, 1994, abandoned.

[51] Int. Cl.$^6$ .............................. G06K 9/00; G06K 9/46; G01S 15/00; G06G 7/48
[52] U.S. Cl. .................. 382/118; 382/190; 364/521; 364/522
[58] Field of Search .................. 382/118, 190; 364/521, 522

[56] References Cited

U.S. PATENT DOCUMENTS

| | | | |
|---|---|---|---|
| 3,805,238 | 4/1974 | Rothjell | 340/146.3 E |
| 3,949,741 | 4/1976 | Hofmann | 128/76 B |
| 4,516,262 | 5/1985 | Sakurai | 382/18 |
| 4,858,000 | 8/1989 | Lu | 358/84 |
| 4,885,702 | 12/1989 | Ohba | 364/521 |
| 4,975,969 | 12/1990 | Tal | 382/2 |
| 5,012,522 | 4/1991 | Lambert | 382/2 |
| 5,163,094 | 11/1992 | Prokoski et al. | 382/2 |
| 5,164,992 | 11/1992 | Turk et al. | 382/2 |
| 5,331,544 | 7/1994 | Lu et al. | 364/522 |
| 5,465,308 | 11/1995 | Hutcheson et al. | 382/190 |

OTHER PUBLICATIONS

Kass et al Snakes: Active Contour Models. Inter. Journal of Comp. Vision, 321–331 (1988) 1987 KLuwer Academic Publishers, Boston.

Mark at el "Wrinkling and head shape as coordinated sources of age-level classification". Perception and Psych. 1980, vol. 27(2), 117–124.

*Primary Examiner*—Andrew W. Johns
*Assistant Examiner*—Monica S. Davis
*Attorney, Agent, or Firm*—Law Offices of Brian S. Steinberger; Brian S. Steinberger

[57] ABSTRACT

The invention includes a four step process for automatically finding facial images of a human face in an electronically digitized image (for example, taken by a video-camera), and classifying the age of the person (associated with the face) into an age category. For example three age categories: a baby(up to approximately age 3), a junior person(above age 3 to approximately age forty), and a senior adult (over forty years old). Categories can be further subdivided whereas every three years could be a further age category. Step 1 of the process is to find facial features of the digital image encompassing the chin, sides of the face, virtual top of the head, eyes, mouth and nose of the image. Step 2 is to compute the facial feature ratios of the facial features ratios of the facial features found in Step 1. Step 3 is to compute a wrinkle analysis of the image. Step 4 is to combine the previous two steps to categorize age of the facial image. The invention can locate and detect facial images for age classification from digital camera images and computerized generated images. The invention can be practiced in areas such as population statistic gathering for patrons at entertainment/amusement parks, television viewer ratings. Furthermore, the invention has utility in automated security/surveillance systems, demographic studies, safety monitoring systems, computer human-interface operations and automated photography. The latter to allow for point and shoot focus on specific individuals as a function of their age classification.

15 Claims, 21 Drawing Sheets

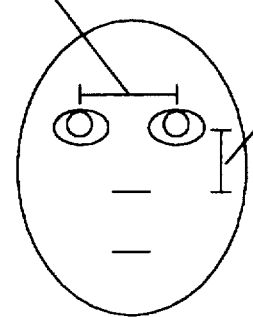
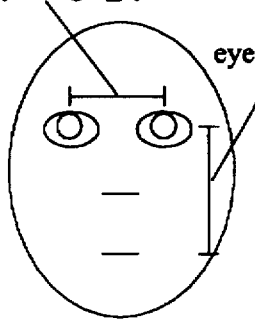
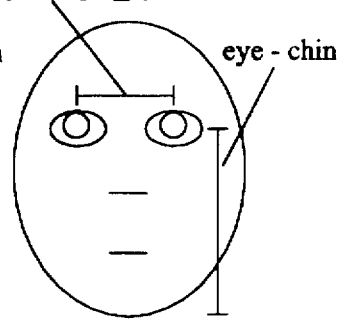
Fig. 12A ratio 1     Fig. 12B ratio 2     Fig. 12C ratio 3
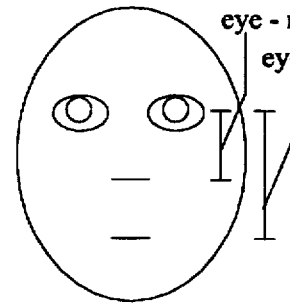
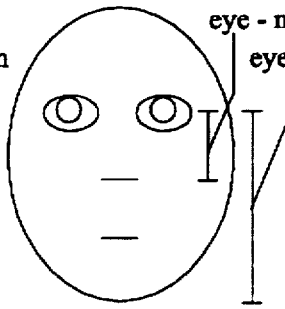
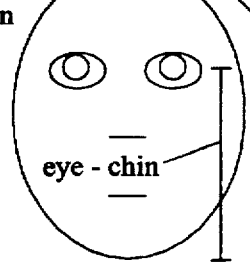
Fig. 12D ratio 4     Fig. 12E ratio 5     Fig. 12F ratio 6

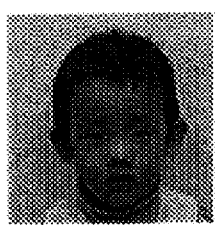    
Fig. 19a (baby01)    Fig. 19b (baby02)    Fig. 19c (baby03)    Fig. 19d (baby04)    Fig. 19e (baby05)
   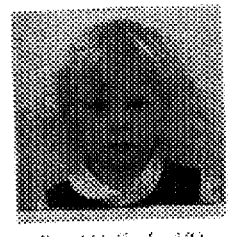 
Fig. 19f (baby08)    Fig. 19g (baby10)    Fig. 19h (baby12)    Fig. 19i (baby13)    Fig. 19j (baby14)
    
Fig. 19k (baby15)    Fig. 19l (baby16)    Fig. 19m (baby17)    Fig. 19n (baby18)    Fig. 19o (baby19)
    
Fig. 19p (baby20)    Fig. 19q (baby21)    Fig. 19r (baby22)    Fig. 19s (baby24)    Fig. 19t (baby25)
 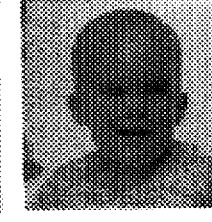  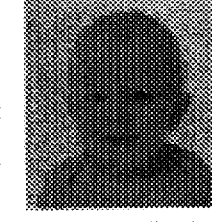 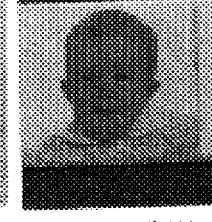
Fig. 19u (b02)    Fig. 19v (b06)    Fig. 19w (b07)    Fig. 19x (b09)    Fig. 19y (b18)

 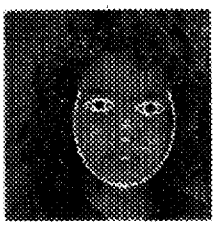   
Fig. 20a (baby01)　Fig. 20b (baby02)　Fig. 20c (baby03)　Fig. 20d (baby04)　Fig. 20e (baby05)
   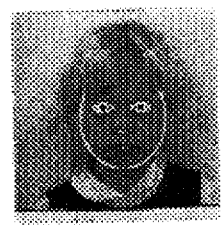 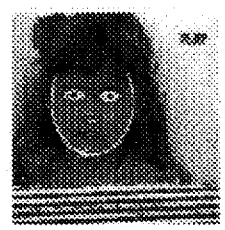
Fig. 20f (baby08)　Fig. 20g (baby10)　Fig. 20h (baby12)　Fig. 20i (baby13)　Fig. 20j (baby14)
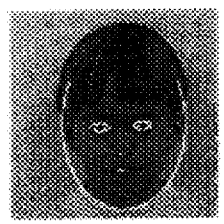 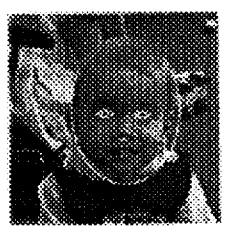   
Fig. 20k (baby15)　Fig. 20l (baby16)　Fig. 20m (baby17)　Fig. 20n (baby18)　Fig. 20o (baby20)
    
Fig. 20p (baby20)　Fig. 20q (baby21)　Fig. 20r (baby22)　Fig. 20s (baby24)　Fig. 20t (baby25)
 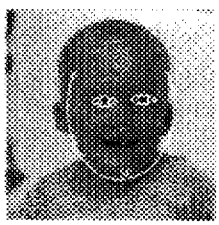   
Fig. 20u (b02)　Fig. 20v (b06)　Fig. 20w (b07)　Fig. 20x (b09)　Fig. 20y (b18)

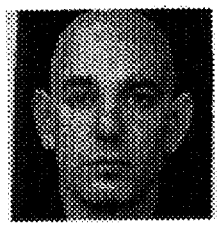    
Fig. 21a (adult01)  Fig. 21b (adult04)  Fig. 21c (a01)  Fig. 21d (a02)  Fig. 21e (a04)
    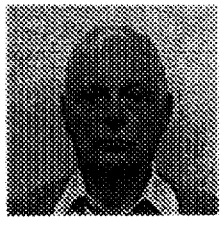
Fig. 21f (a06)  Fig. 21g (a12)  Fig. 21h (a19)  Fig. 21i (sar01)  Fig. 21j (sar02)
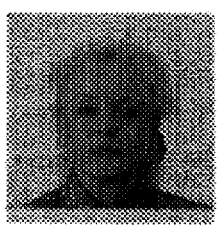    
Fig. 21k (sar03)  Fig. 21l (sar05)  Fig. 21m (sar06)  Fig. 21n (sar07)  Fig. 21o (sar10)
 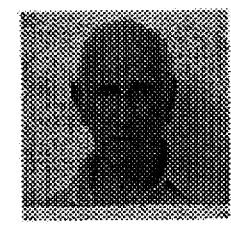 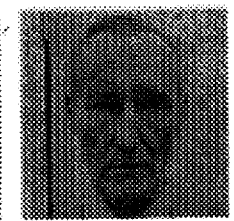  
Fig. 21p (sar11)  Fig. 21q (sar15)  Fig. 21r (sar18)  Fig. 21s (s01)  Fig. 21t (s10)
 
Fig. 21u (s11)  Fig. 21v (s12)

    
  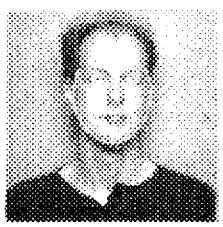 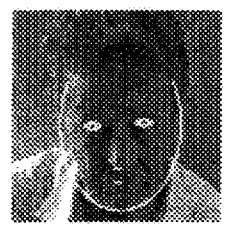 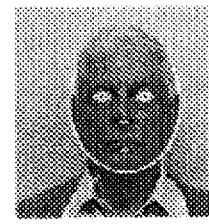
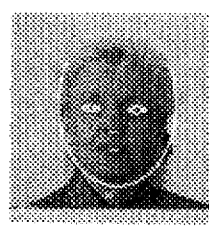    
 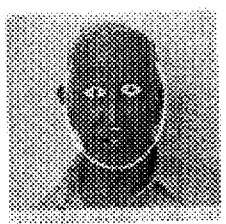 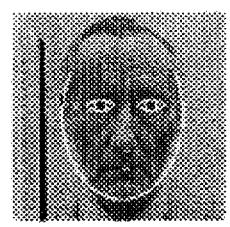  
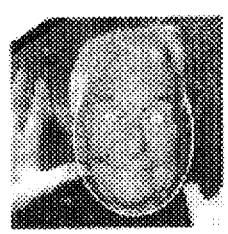 

AUTOMATIC FEATURE DETECTION AND AGE CLASSIFICATION OF HUMAN FACES IN DIGITAL IMAGES

This invention relates to the detecting of human faces from visual images, and in particular to a process for automatically finding and detecting a human face and age classifying the facial image from digital images. This application is a continuation of application number 08/448,721, filed May 25, 1995, now abandoned, which is a Continuation-In-Part to application Ser. No. 08/261,947 filed on Jun. 17, 1994 entitled: Face Detection From Digital Images Using Templates Pending, which in turn is a Continuation-In-Part to application Ser. No. 08/198,816 filed on Feb. 18, 1994 entitled Automatic Feature Detection and Age Categorization of Human Faces in Digital Images, now abandoned.

BACKGROUND AND PRIOR ART

Humans are generally able to categorize a person to a precise age group based on an image of the person's face. Humans also have the capability of recognizing familiar faces as well as recognizing facial expressions. For computers to have these visual capabilities would represent a major commercial advantage. However, current computer vision systems lack the ability of finding faces in images and completing facial analysis. A further problem exists in that the ability of age categorization based on facial analysis has not been successfully accomplished by computer vision.

U.S. Pat. No. 3,805,238 to Rothjell describes a method of identifying human beings using selected facial body curves. However, this patent is limited to the facial side profiles and does not analyze minute detailed curves such as the facial wrinkles which are unique to each human being and is not specifically concerned with digitally created images. Furthermore, Rothjell does not categorize the ages of faces. U.S. Pat. No. 4,975,969 to Tal describes analyzing facial parameters. However, this patent also does not analyze the unique facial features such as the facial wrinkles of the subject being examined nor does any type of age classification. U.S. Pat. No. 5,163,094 to Prokoski et al. describes a system for identifying individuals from images. However, this patent restricts the detected image to that taken by a thermogram. The thermogram pictures used in Prokoski et al. generally center on various heat levels that are broadly generated by a face but the thermograph pictures themselves do not recognize nor show the specific wrinkles that are unique to each individual's face nor describe any type of age classification. In the Prokoski et al. patent the thermograms are dependent upon the heat generated by interior blood vessels and are not dependent upon exterior facial features such as wrinkles.

Using computer vision for facial recognition, analyze age classification from facial images and to interpret facial-expressions, can be used in various application areas such as but not limited to the gathering of population and age-statistics from patrons at entertainment/amusement parks and television network viewer-rating studies. Computer vision with this capability can further have application in such fields as automated security/surveillance systems, demographic studies, safety monitoring systems, human interfaces with computers, and automated photography.

Current problems exist with manual operated cameras. In photography, one may wish to aim the camera in the vicinity of a subject's face and have the camera center itself on that face automatically. Normally, users must take time to manually adjust the camera lens and the body of the camera itself. Such manual adjustments would also be needed if the person taking a picture must search for a single recognized face from multiple faces in a scene. With manual adjustments, the quality of the pictures can than depend upon the skill of the user. The manual adjustments usually results in different users taking nonuniform pictures of dissimilar quality if they all use the same camera at different times. An automated point-and-shoot camera and camcorder would eliminate the adjustment problems prevalent from making manual adjustments. None of the prior art listed above allows for detecting a facial image that would allow for a camera to automatically align itself to point and shoot a subject. Automated point-and-shoot cameras using face detection technology can create pictures of a uniform quality by different users.

Another problem exists where computers are interacting and responding to human users. While computers may be able to differentiate between audible word commands, the inventors are not aware of any such systems that will allow a computer to interpret and respond to the facial images of a user. For example, a human's moves their lips to say no, and/or frowns, and/or shakes their head from side-to-side, another person naturally interprets these expressions as a negative response to a question even when no sounds are audible. None of the prior art cited above addresses the problems of recognizing the common meaning intended by a particular facial feature. Thus, in human computer interfaces it is advantageous to be able to find the human face in the scene, so that the computer can respond to the facial expression of the human, and then be able to interpret the plain meaning of the facial features of that human. Utilizing a computer to translate the facial features of a human can have significant applications such as but not limited to serving the needs of the blind and deaf.

SUMMARY OF THE INVENTION

The first objective of the present invention is to provide an automatic method of categorizing a person's age according to a facial digital image.

The second object of this invention is to provide a method of using computer vision to recognize the existence of a facial image from a digital image.

The third object of this invention is to provide a method of finding facial features exist from the detected human face.

A fourth object of this invention is to provide a method to interpret and recognize the common meaning intended by the facial image.

A fifth object of this invention is to categorize age based on facial features, facial feature ratios and wrinkle analysis.

A preferred embodiment for this invention covers four steps. The first step is to find facial features from a digital facial image. The second step is to compute facial feature ratios. The third step is to compute wrinkle analysis on the facial features and ratios. The fourth step is to categorize age from these steps.

Further objects and advantages of this invention will be apparent from the following detailed description of a presently preferred embodiment which is illustrated schematically in the accompanying drawings.

3

Figure 1A:
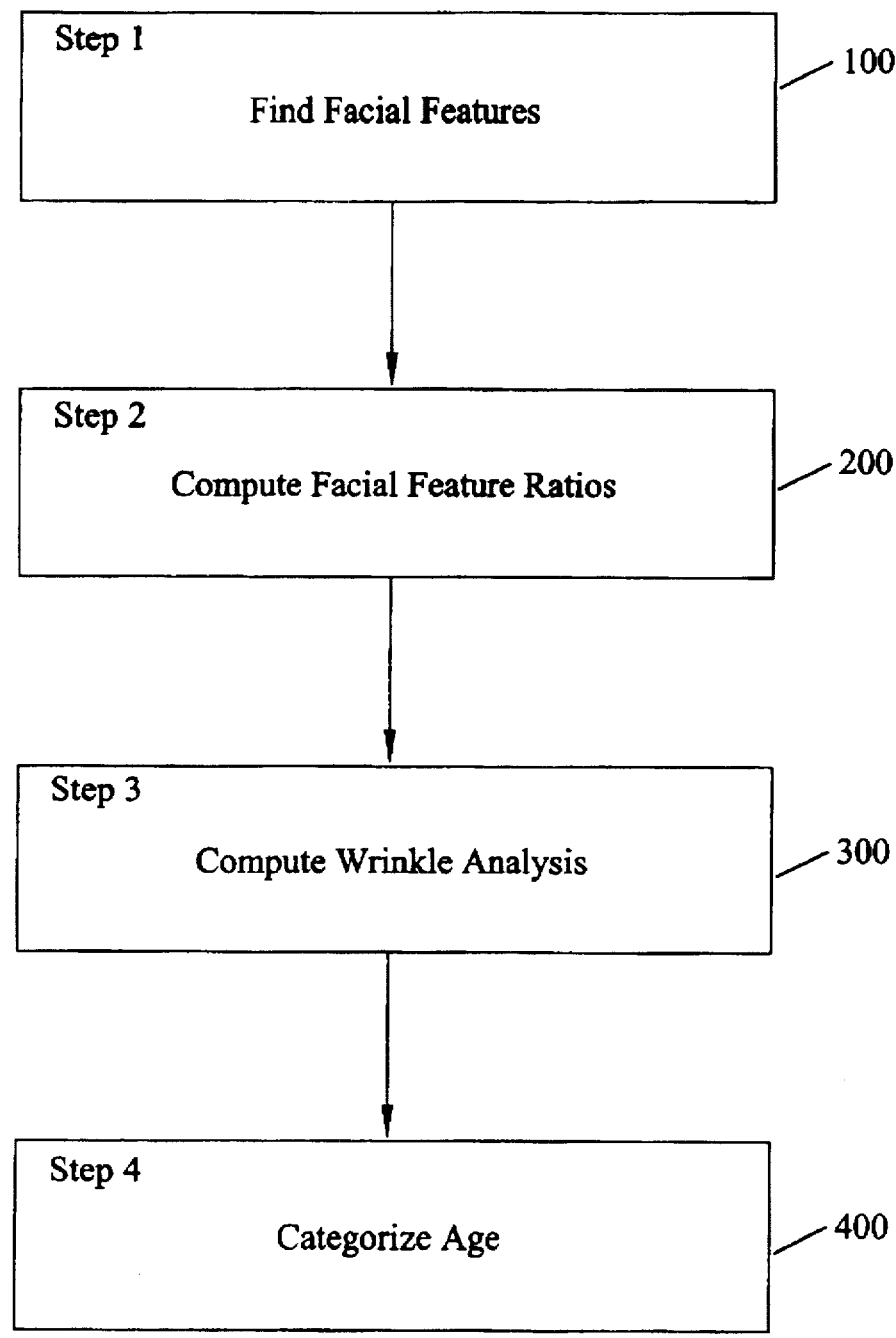
Fig. 1A is a flow chart overview of the four step process used in the preferred embodiment for age classification.
Figure 1B:
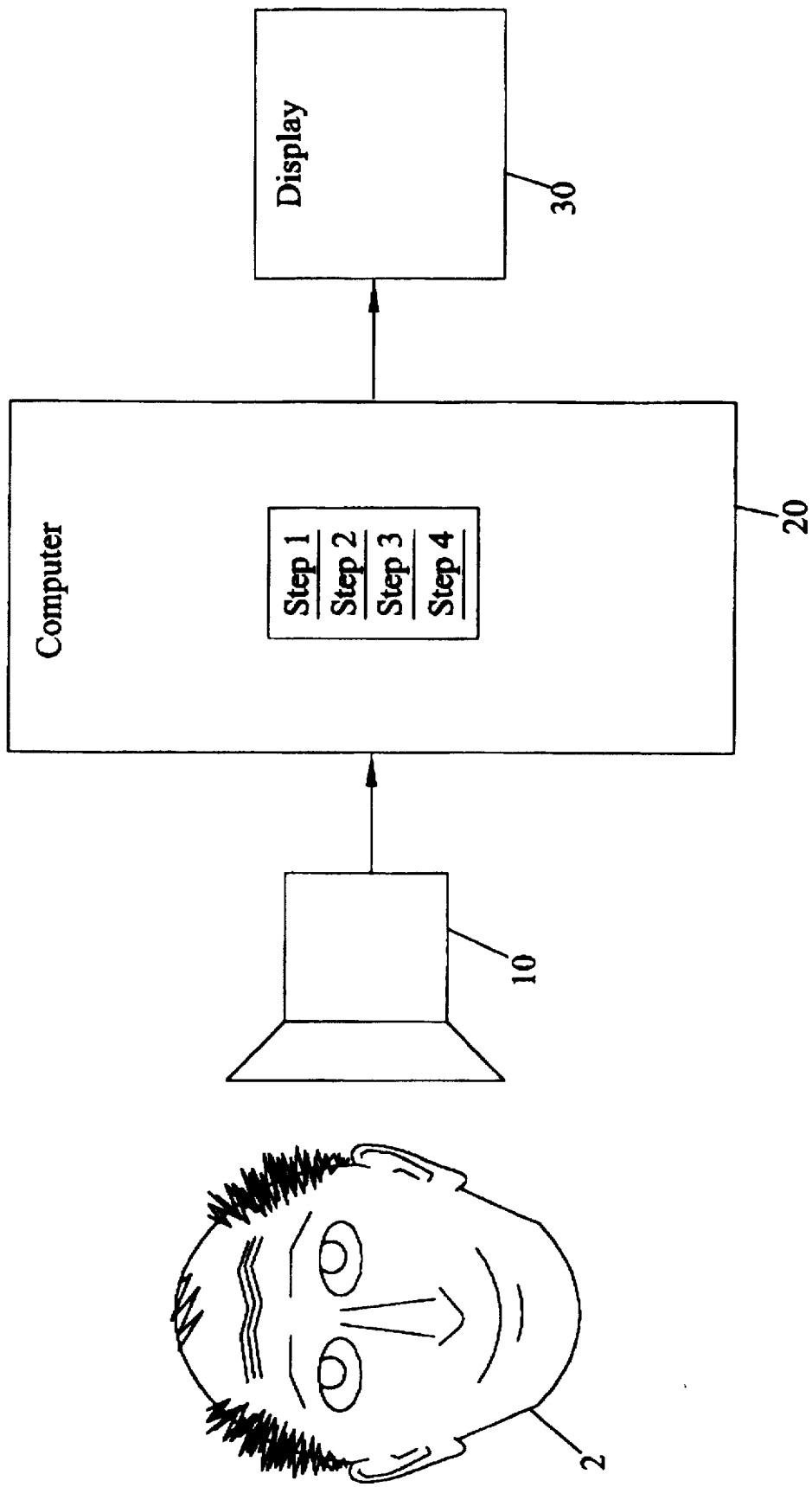
Fig. 1B illustrates preferred components for performing the invention of Fig. 1A.
Figure 2:
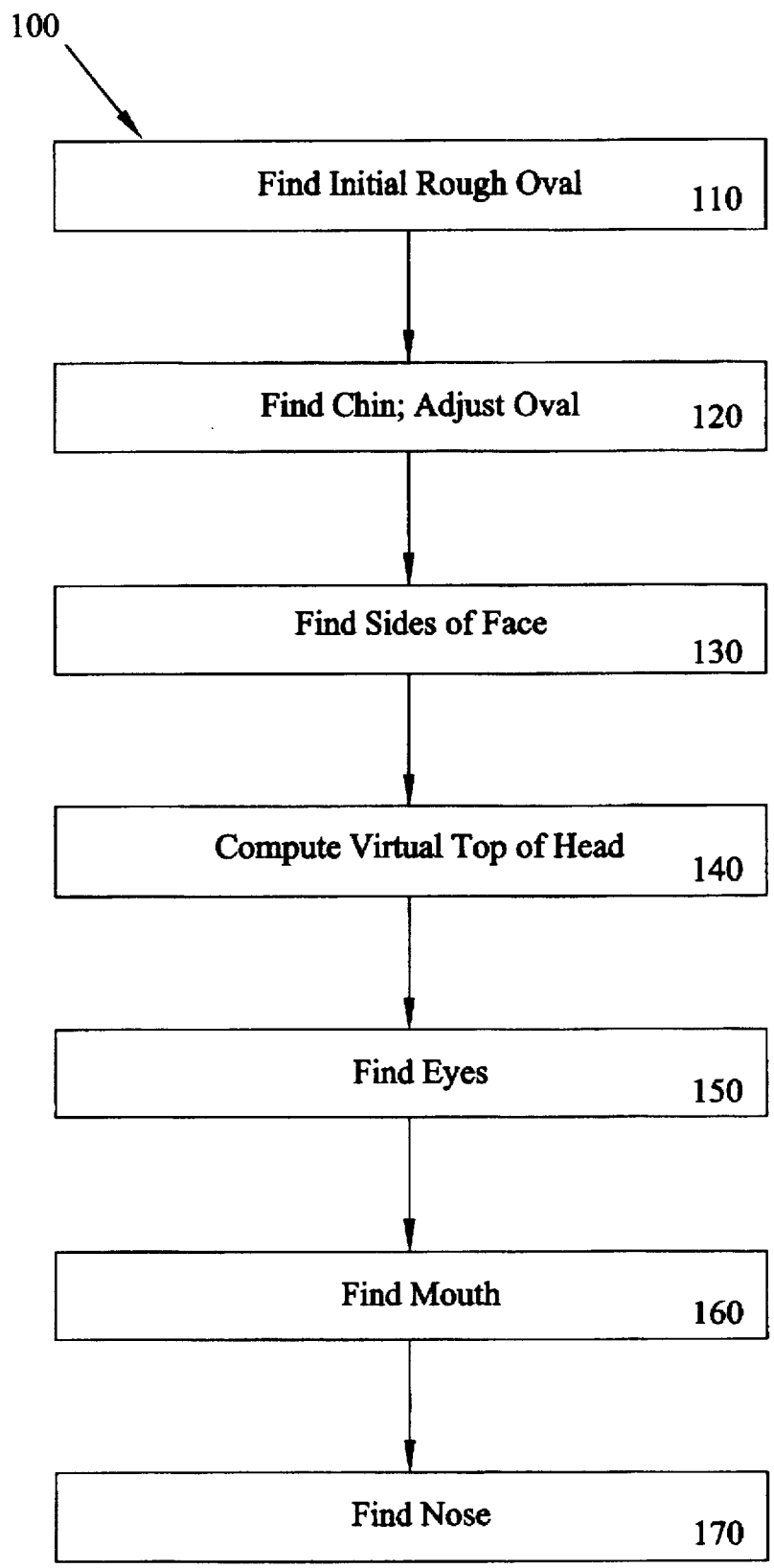

FIG. 2 illustrates the seven stages followed in step one of FIG. 1B.

Figure 3:
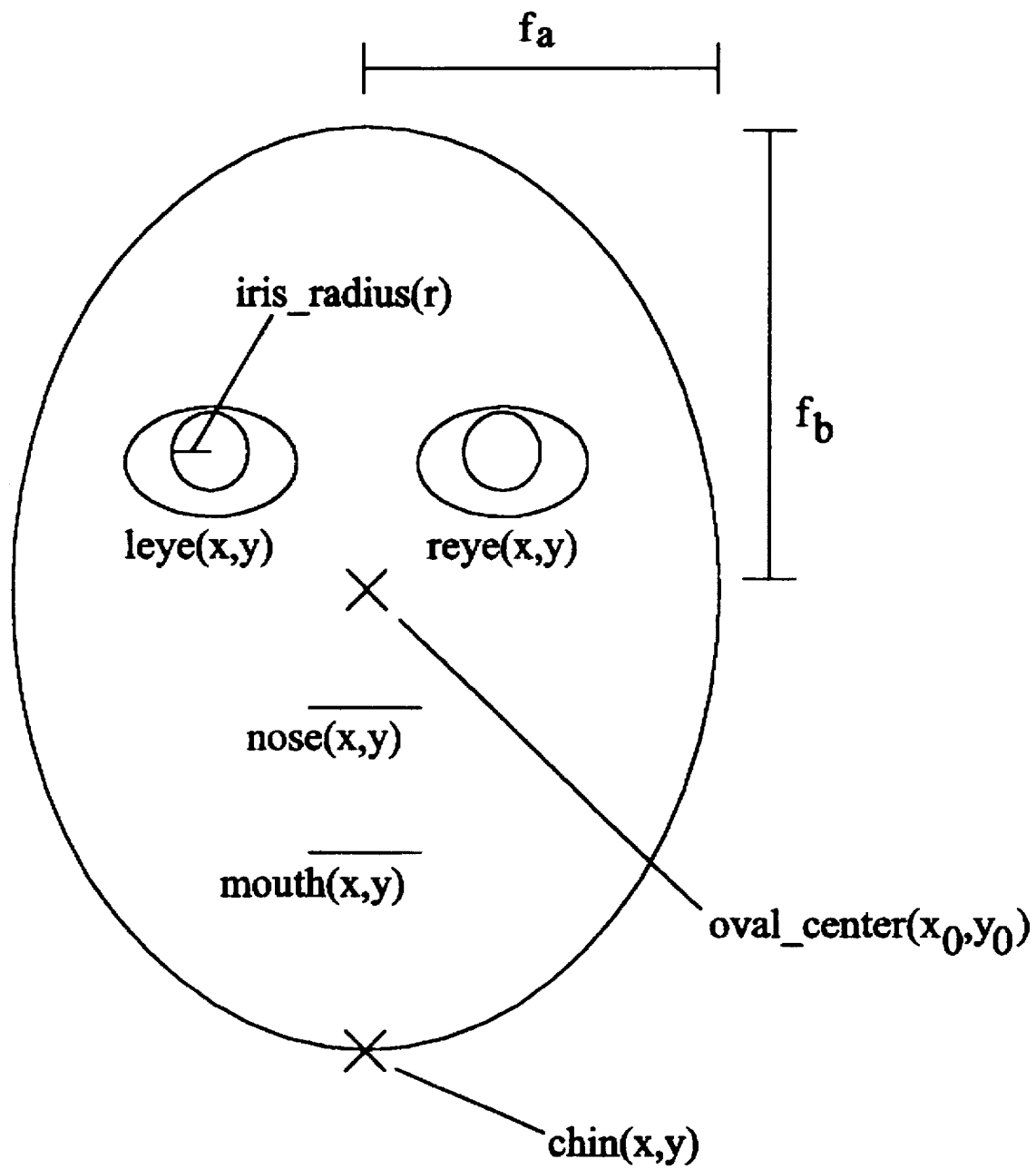

FIG. 3 shows a face template with the parameters used for oval-fitting and eye fitting.

FIGS. 4a through 4f illustrates the process followed in the oval fitting stage of FIG. 2.

FIGS. 5a through 5f illustrates the various stages followed in a chin finding procedure of FIG. 2.

Figure 6A:
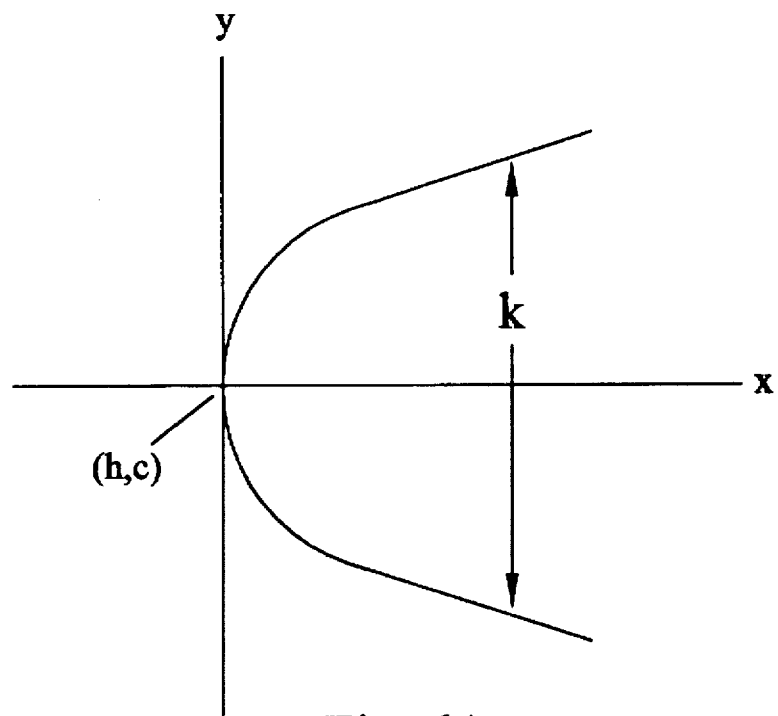

FIGS. 6a and b, respectively shows the right and left open-ended parabolas.

FIGS. 7a through 7e illustrates the changes followed in locating the left and right sides of the face used in FIG. 2.

FIGS. 8a through 8f shows the outcome for finding a virtual head stage of FIG. 2 from an original image.

Figure 9:
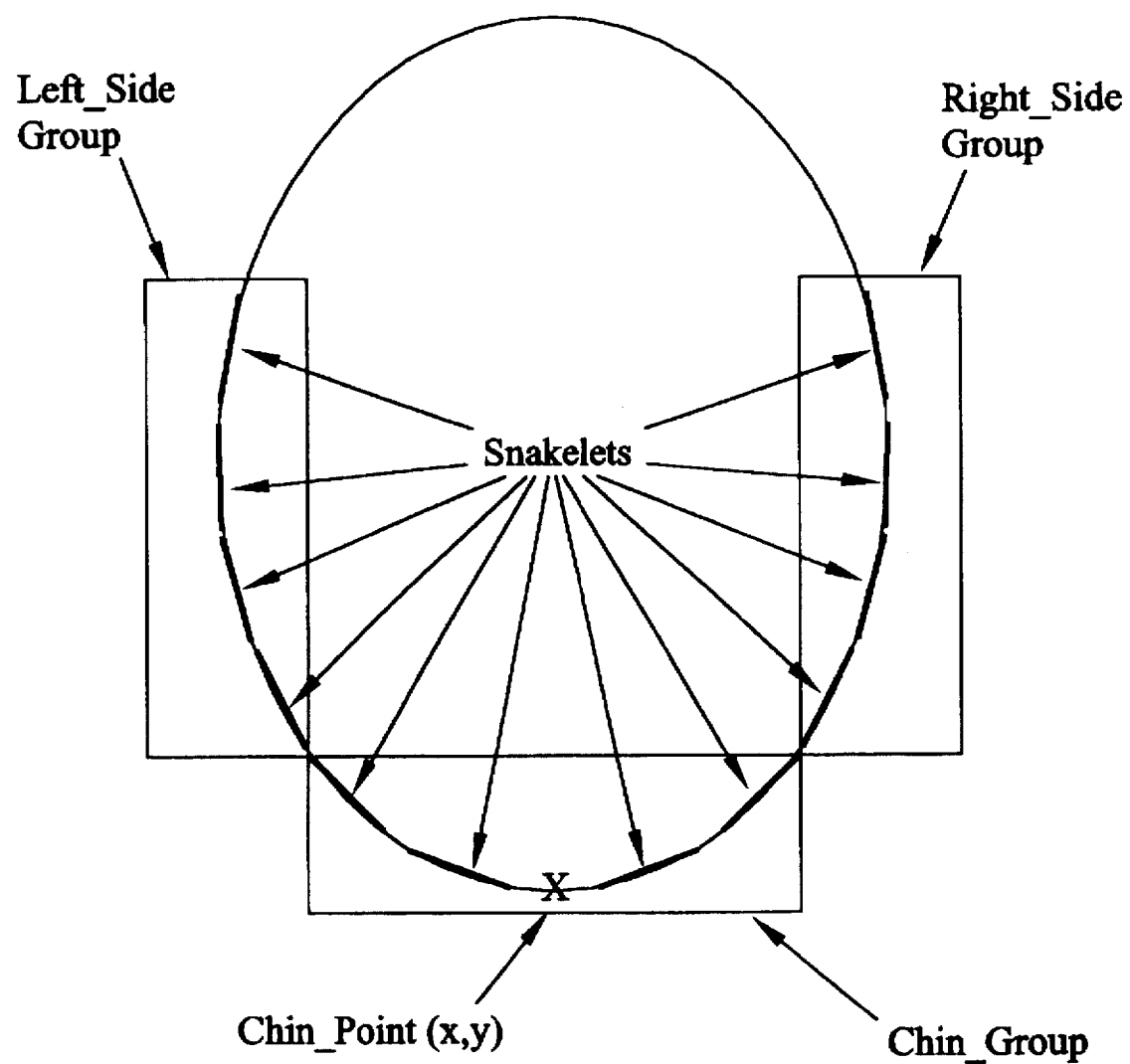

FIG. 9 shows the snakelets and chin-point that is used in the virtual top of head finding algorithm used in one of the stages of FIG. 2.

FIGS. 10a through 10i shows the various levels of the Iris-attracting and fitting stage.

FIGS. 11a through 11d shows the outcome of locating the center of the mouth, and the bottom of the nose.

FIGS. 12a through 12f illustrates the six ratios that are to be evaluated for age classification for Step 2 of FIG. 2.

Figure 13:
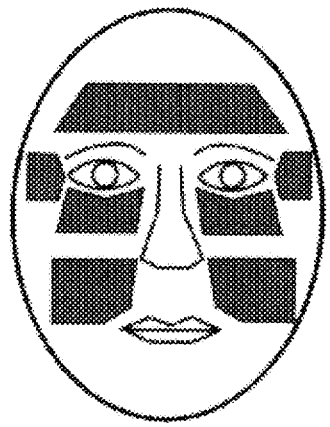

FIG. 13 is a wrinkle geography map used in step 3 of Fig. 1A.

Figure 14:
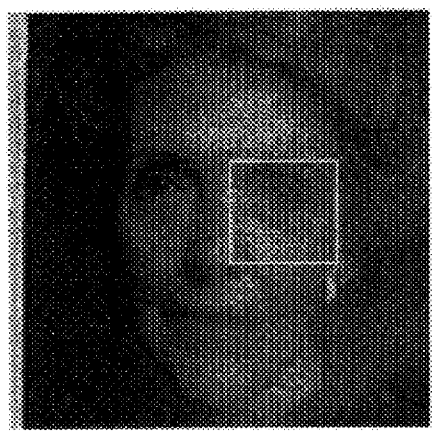
Figure 14:

FIG. 14a and FIG. 14b, respectively depict the relationship of a zoomed-in 256×256 image to the original 256×256 image used in step 3 of FIG. 1A.

Figure 15:
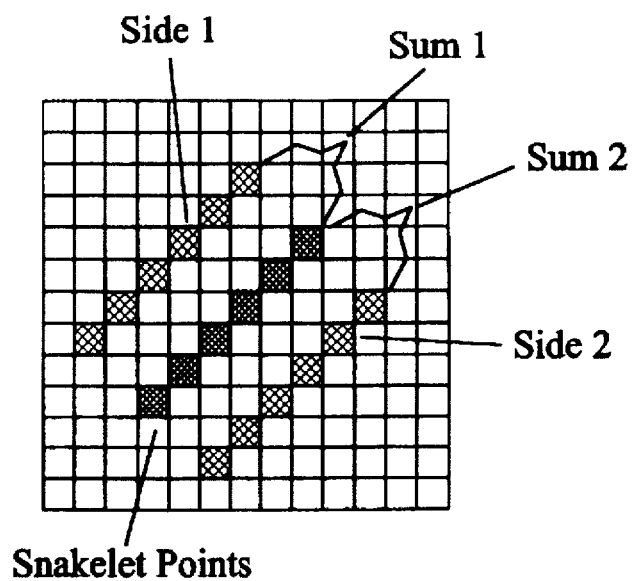

FIG. 15 shows the directional derivative orthogonal to the snakelet curve for each side of the snakelet used in Step 3 of FIG. 1A.

Figure 16A:
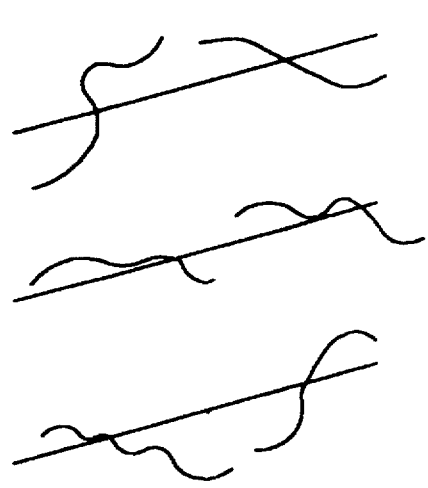
Figure 16B:
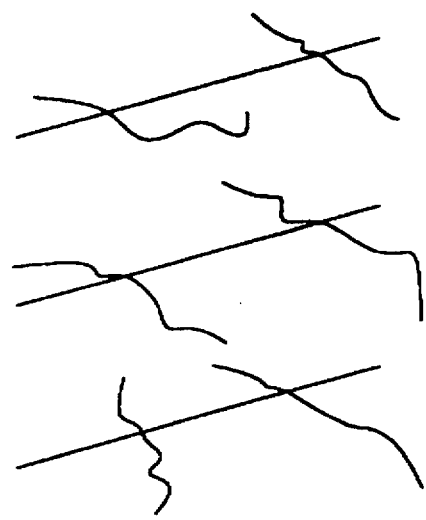

FIGS. 16a and 16b illustrate a pictorial description of the Wrinkle Pattern test of Step 3 of FIG. 1A that shows how pairs of snakelets are judged as to whether they are part of a wrinkle.

FIGS. 17a through 17i shows the outcomes of the wrinkle analysis process of Step 3 of Fig. 1A applied to a senior, a young adult and a baby in the area beneath an image's right eye.

FIGS. 18a through 18i shows the outcomes of the wrinkle analysis process of Step 3 of Fig. 1A applied to a senior, a young adult and a baby in the area around the forehead.

FIGS. 19a–19y shows the original images for the baby class.

FIGS. 20a–20y shows the final fit for the baby class of FIGS. 19a–19y.

FIGS. 21a–21v shows the original image for the adult and senior class.

FIGS. 22a–22v shows the final fit for the adult and senior class of FIGS. 21a–21v.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

Fig. 1A is a flow chart overview of the four steps used for age classification according to the invention. The first step 100 is to find facial features from a digital image. The first step 100 is elaborated on in FIG. 2. The second step, in Fig.

4

1A, is to compute facial feature ratios at 200. The third step is compute the wrinkle analysis at 300. The fourth and final step is to combine Step 2 and Step 3 to categorize the age of the image at 400.

In FIG. 1B, all four steps of Fig. 1A can be executed by a computer 20. A facial image with inherent wrinkles, 2 is retrieved by a digital camera 10 such as a camcorder and the like. A computer 20 executes steps 1–4 of Fig. 1A, and displays age classificiation informtion from display 30. Components 10, 20 and 30 can be standard off-the-shelf components. Such types of components that are used to operate steps 1–4 of FIG. 1A can be the corresponding hardware components in U.S. Pats. 3,805,238 to Rothfjell; 4,975,969 to Tal; and 5,012,522 to Lambert which are each incorporated by reference.

STEP 1: FIND FACIAL FEATURES

FIG. 2 illustrates the seven stages followed in the first step 100 of FIG. 1A of finding facial features from a digital image. The localization of the facial features from a digital image is performed in seven stages from 110 to 170.

At each stage in FIG. 2 a particular facial feature parameter is found. The center position of the head in the image is initially guessed from an image. The initial oval-finding stage 110 finds an oval that best fits the face/head, and consequently the center position of the head is updated. The chin-finding stage 120 finds the best chin in the rectangular area specified by the oval parameters. The face sides-finding stage 130 finds the left and right sides of the face in the area specified by the chin and oval parameters. The virtual head computation 140 is then computed from the oval generated from the chin and the two face sides. The chin position, if it is found, is then used to refine the initial oval. Otherwise, the initial oval is used for the remaining stages. For the eye finding stage 150, both the left and the right iris center of the template are placed near the respective iris centers in the image specified by the oval parameter. The iris-fitting stage tries to fit more accurately the iris radius and simultaneously improves estimates of both iris center positions. The mouth-finding stage 160 finds the position of the center of the mouth. Finally the nose-finding stage 170 finds the position of the bottom of the nose.

FIG. 3 shows a face template with the parameters used for oval-fitting and eye fitting by use of a potential image of an edge. The potential image refers to the output of operators that pocess the image so that it can be used by subsequent stages. An edge in an image is a discontinuity in the intensity of the image or in its rate of change. In FIG. 3, the potential image for the edge$\phi_{edge}$was generated b-first applying a morphological operator of close(21) and then blurring it by using an exponential filter $e^{-\alpha(x^2+y^2)^{1/2}}$ with an $\alpha$ of 0.8. A morphological operator applies an operator to an image in three steps: first the image has its similar-intensity regions broadened; second another version has its similar-intensity regions narrowed; and third, the second version is substracted from the first. The potential image for the-valley (which is the region of lowest intensity in the image) was generated by first applying a morphological operator which first broadens the similar-intensity regions, and then narrows them, and then blurring it by using an exponential filter with an $\alpha$ value of 0.4.

The eye potential image is the potential image to assist finding the eye; this potential image is generated by a first difference operator of size 3, in both X and Y directions. The symbols in FIG. 3 breakdown as follows:

Oval Center (x0, y0) is the center of the oval.

fa is half the horizontal width of the oval through its center fb is half the vertical height of the oval through its center r is the radius of the left iris; it is also the radius of the right iris.

leye (x,y) is the center position of the left iris reye (x,y) is the center position of the right iris nose (x,y) is the position of the base of the nose mouth (x,y) is the center of the mouth chin (x,y) is the lowest point of the chin Find Initial Rough Oval The initial oval-finding stage 110 uses the edge-image potential to find the best oval that fits the image.

$$E_{oval\_total} = E_{edge} + E_{internal}$$

$$E_{edge} = \frac{c_2}{length} \int_{face\_edge} \Phi_{edge}(x) ds$$

$$E_{internal} = k_1(X_e - X_c) + k_1(Y_e - Y_c - (0.1 f_b)) + k_2(f_a - 0.7 f_b) + k_3 e^{-\beta_1 f_a} + k_3 e^{-\beta_3 r}$$

The coefficients used are: $c_2=200$, $c_3=100 k_1=100$, $k_2=100$, $k_3=100\,000$, $\beta_1=0.04$, $\beta_2=0.028$.

Figure 4:
Figure 4:
Figure 4:
Figure 4:
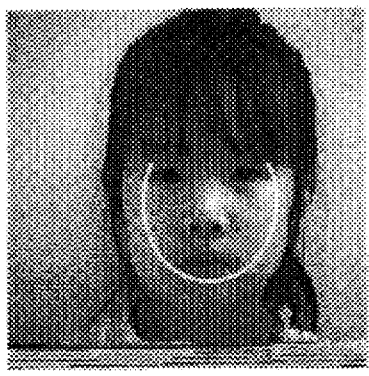
Figure 4:
Figure 4:

The oval axes half-lengths ($f_a$, $f_b$), are initialized with a value and the oval is positioned inside the face perimeter. The $k_1$ term force draws the oval center downward because the oval center found in stage 1 is biased towards the top due to the inclusion of hair in stage 1. The $k_1$ term also maintains the horizontal component of the center close to where it was initially dropped. The $k_3$ terms are an outward forcing term of each half-length to prevent the oval from becoming too small. The $k_3$ term also helps to overcome the possibility of the lower edge of the oval stabilizing around the mouth. The $k_2$ term tries to maintain a ratio that is reasonable for a face. The fitting of the oval is performed by iteratively updating the oval center position and the oval axes half-lengths ($f_a$, $f_b$). The update formula is obtained by gradient descent with-respect to these four parameters. The stage is complete when the total energy stabilizes around a minimum value. FIG. 4 illustrates the process followed in the oval fitting stage. FIG. 4a shows an original image. FIG. 4b shows the image with a negative edge potential. FIGS. 4c through 4f show the various stages of fitting the oval until a final fit has been reached.

Chin-Finding Stage

The chin-finding stage 120 of FIG. 2, uses the edge-image potential to find the bottom of the chin. First, multiple snakelets are dropped in random orientations in a grid, one per grid point, in a rectangular region of width $\frac{1}{2}F_a$ centered at the vertical axis of the oval center, and of height $\frac{1}{4}f_b$ to the top and $\frac{1}{8}f_b$ to the bottom positioned from the horizontal axis tangent to the bottom of the oval. .

In the subject invention, small preselected curves, which are also referred to as snakelets are dropped onto an image. This process has also been referred to as snakes. Snakes is a method of matching a model of a curve to an actual curve in a general image. Snakelets is described by Kass M., Witkin A. and Terzopoulos D (1988), "Snakes:Active Contour Models", International Journal of Computer Vision, pp. 321–331, which is non essential subject matter to be incorporated by reference.

Our invention uses snakes to find pieces of curves, such as a piece of a wrinkle or a piece of a chin, or a piece of a side of a face and the like. These pieces of snakes(curves) are also called snakelets. In a digital image where intensity values in that image can be interpretted as height, a snake is a curve, representing a preselected string of connected pixels, such that this curve/snake will tend to adjust itself so that the curve/snake falls into a local valley. Intensity values can be arbitrarily chosen. Hence, such a curve/snake is first dropped somewhere (fitting over certain pixels), then the connected curve/snake will tend to slither down the intensity valley till it stabilizes and slithers no more. The manner in which stabilization is evaluated is by adding together the intensity values beneath a curve/snake. Then if by moving one of the points to a neighboring pixel, the sum can be decreased, the movement is carried out. If the movement will increase the overall sum, no movement is carried out. After all posibilities have been examined, the curve/snake is said to have stabilized. Thus, stabilization is when no more movement occurs amongst the connected pixels. When no more movement is occuring, the curve/snake is now aligned to and generally matches a natural curve in the image. Again, the natural curve in an image can be a wrinkle and the like. FIGS. 5C through 5E show an exemplary example of dropping the curve/snakes, matching and the stabilization of the curve/snakes over natural facial curves.

After all the snakelets have stabilized, they are used to obtain a Hough Transform for the strongest parabola in that region. The voting scheme is implemented in two stages. First, each snakelet votes for a coarse candidate position for the base of the parabola. Non-maximal suppression is performed on these votes, and the best five are chosen. Amongst these five, the one that is located in the highest position on the face (to eliminate parabolas corresponding to necklines of clothing, or of the shadow formed by the chin) is chosen. Then, the snakelets that voted for this winning position of the base are identified, and a finer search of the base is performed in a similar manner.

This leads to detection of the chin, when it is delineated in the raw image. If the image quality is poor, or illumination conditions are bad, the correct position of the chin is very difficult to find.

Determination of whether a chin is found is currently done by human visual inspection. If it has been found, it is used in three places: to refine the initial oval; to find the virtual top of the head using also the sides of the face (see upcoming sections on "Face Side-finding stage" and "Finding the virtual top of the head"); and to be used in ratios 3a and 5a. If it is determined that it is not found, the bottom of the initial oval is used in the ratios, thus requiring ratios 3b and 5b. In these ratios, the chin is referred as "ochin" (for oval-chin).

Figure 5:
Figure 5:
Figure 5:
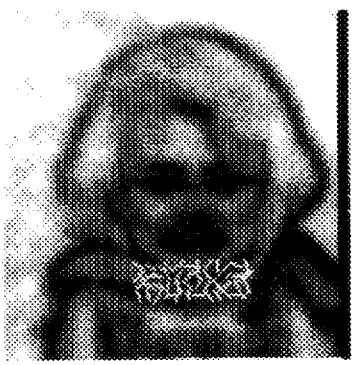
Figure 5:
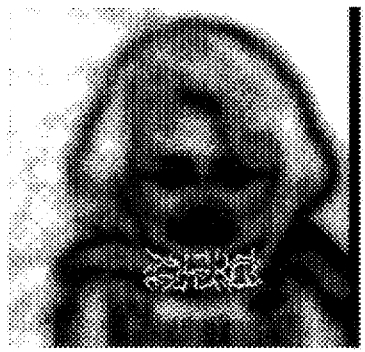
Figure 5:
Figure 5:

FIG. 5 illustrates the various stages followed in a chin finding procedure. FIG. 5a shows an original image. FIG. 5b shows the image with a negative of edge potential. FIG. 5c shows the image after snakelets have been dropped. FIG. 5d shows the image with snakelets at an intermediate stage. Fig. 5e shows the snakelets in a stabilized form. Fig. 5f shows the winner in Hough space marked with and "X", which signifies the chin in the image.

Face Side-Finding Stage

Figure 6B:
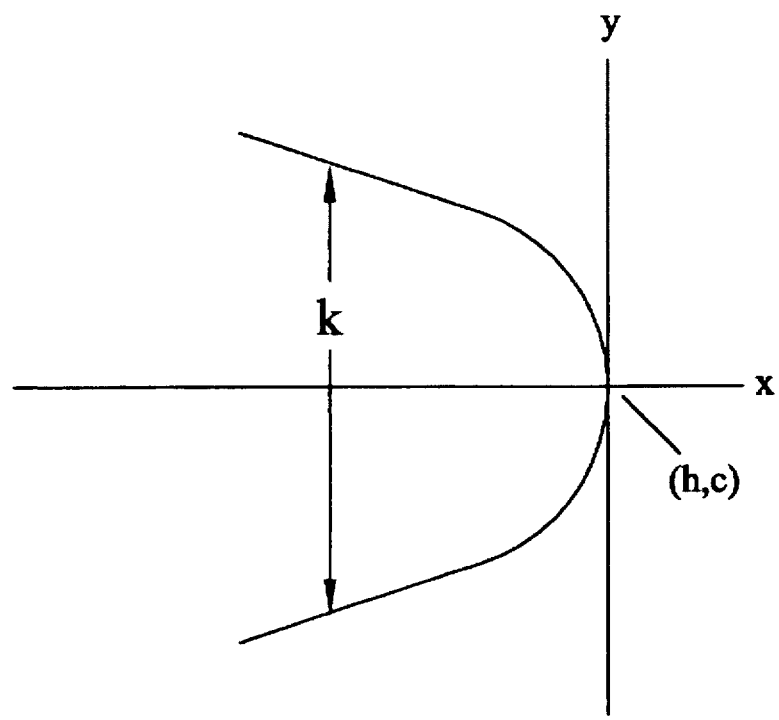

The face side-finding stage 130 of FIG. 2, uses the edge-image potential to find the left and right sides of the face. This stage uses the parabola-fitting algorithm, except that the parabola equations are modified to suit the left and right open-ended parabolas. FIGS. 6a and 6b shows the right and left open-ended parabolas. FIG. 6a shows a right open-ended parabola used to fit the left side of a face. FIG. 6b shows a left open-ended parabola that is used to fit the right side of a face.

The parabola-fitting algorithm is as follows:

```
for all snakelets {
    for h = h_min to h_max {
        /* (x_1, y_1) and (x_2, y_2) are two end points of the snakelet; */
        c = (x_2 - h)^2 y_1 - (x_1 - h)^2 y_2 / (x_2 - h)^2 - (x_1 - h)^2;
        BIN[h,c]++;      /* Increment bin */
    }
}
Perform Non-Maxima suppression;
    (keep only the local peaks)
Select the 5 local maxima and rank them in descending order;
Select the winning bin, which is BIN[h,c];
Extract the snakelets that voted for the winning bin, for later use;
```

For the right open-ended parabola of FIG. 6a, the parabola equation is:

$$x = k(y-c)^2 + h$$

For the left open-ended parabola of FIG. b, the parabola equation is:

$$x = -k(y-c)^2 + h$$

Figure 7:
Figure 7:
Figure 7:
Figure 7:
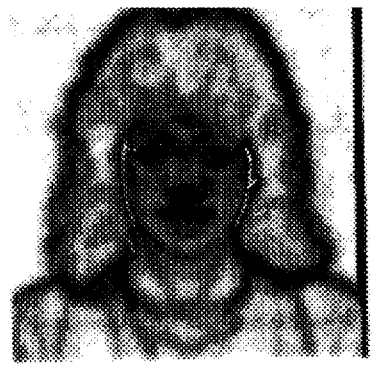
Figure 7:
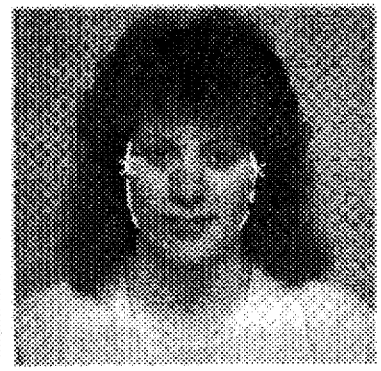

FIG. 7 illustrates the changes followed in locating the left and right sides of the face. This process works even under conditions that are not ideal, except when the ear is too close to the side of the face, or when there is dishevelled hair below the lower half of the face. FIG. 7a shows the original image. FIG. 7b shows the negative of the edge-image potential. FIG. 7c shows a rectangular grid of randomly oriented snakelets dropped on each side of the initial oval. FIG. 7d shows the image with the snakelets settling down. FIG. 7e shows the symbol "X" on each side that marks the base point of the parabola for that side of the face.

Finding the Virtual Top of the Head

Computing the virtual top of head in stage 140 of FIG. 2 is very difficult to estimate when the person has hair on their head. Hence, an alternative strategy is used here.

At this stage, the three pools of snakelets that voted for winning parabolas in FIG. 7e are pooled, and a single oval is fit to all the snakelets' points. The oval is used to find the virtual top of the head, as confined by the snakelets that supported the parabolas of the chin and sides of the face. The purpose of this is to have an estimate of the ratio of the height of the eyes from the chin, relative to the virtual top of the head. This process can be affected by the errors in finding the sides of the face, which in turn are affected by dishevelled hair in the lower half of the face, and a ear that is too close to the side of the face.

Figure 8:
Figure 8:
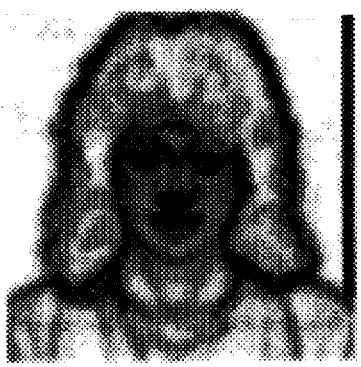
Figure 8:
Figure 8:
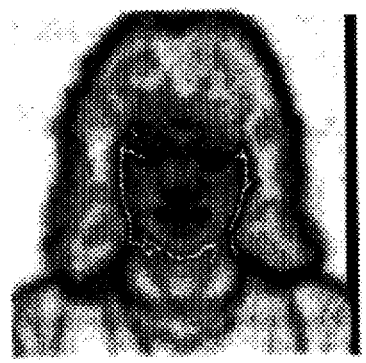
Figure 8:
Figure 8:

FIGS. 8a through 8f shows the outcome for one of the successful cases. FIG. 8a shows an original image. FIG. 8b shows the negative of edge potential of that image. FIG. 8c shows original snakelets dropped for the chin and the sides of face. FIG. 8d shows the snakelets after they have settled down. FIG. 8e shows snakelets that support the three parabolas. FIG. 8f shows that the fit of the face-oval has been refined. Wherein the virtual top of the head is the top of the oval shown in FIG. 8f.

The following is a numerical description of the process of estimating the oval for the virtual top of the head. The parametric form of the oval equation is as follows:

$$x = f_a * \cos\theta + x_0$$

$$y = f_b * \sin\theta + y_0$$

where $(x_0, y_0)$ = oval-center, (x, y) = point on the oval-edge,

θ = angle from the x-axis, $(f_a, f_b)$ = the respective x and y distances from the oval-center given (x, y), $(x_0, y_0)$ and $f_b$, we can solve for $f_a$:

$$\theta = \sin^{-1}|(y-y_0)/f_b|$$

$$f_a = (x-x_0)/\cos\theta$$

FIG. 9 shows the snakelets and chin point that is used in the virtual top of head finding algorithm used in one of the stages of FIG. 2. FIG. 9 shows the resulting snakelets of the parabola-fitting for the three groups. These snakelets are then used as an input to the virtual top of the head finding algorithm. The algorithm for finding the virtual top of the head is as follows:

```
Perform parabola fitting for chin, left and right sides of the face;
/* As a result from parabola fitting, we have all the snakelets that
   contributed to the three parabola groups and a chin point (x, y) from
   the chin parabola. */
/* The chin point (x, y) serves as the base of the oval */
for all snakelets {
    for each snakelet point SP_i {
        /* SP_i(x, y) = current point under consideration (known) */
        /* x_0 = x from the chin point (x,y) */
        for y_0 = y_min to y_max {
            f_b = y_0 - chin(y);       /*y from the chin point (x, y)*/
            θ = sin^-1|(y - y_0) / f_b|;
            f_a = (x - x_0) / cos (θ);
            BIN [y_0, f_a]++;          /*increment bin */
        }
    }
}
Perform Non-Maxima suppression;
Select the 5 local maxima and rank them in decending order;
Select the winning bin—BIN [y_0, f_a];
```

Eye-Finding Stage

The eye-finding stage 150 of FIG. 2 consists of an iris-attracting sub-stage and an irisfitting sub-stage.

The iris-attracting sub-stage places both the left and the right iris center of the template near the respective-iris centers in the image specified by the oval parameter.

Using the parameters from the refined oval (or the initial oval), both the left and the right iris centers of the template are placed near the respective irises in the image. The left iris center is placed $$\frac{1}{10} f_b,$$

above oval center for y and $$\frac{1}{2} f_a$$

left of the oval center for x. Similarly, the right iris center is placed $$\frac{1}{10} f_b$$

above oval center for y and $$\frac{1}{2} f_a$$

right of the oval center for x. The iris-attracting stage uses the valley image potential $\phi_{valley}$ and the intensity image potential $\phi_{intensity}$ to attract both left and right iris centers to their true positions.

$$E_{eye\_total} = E_{intensity} + E_{valley} + E_{eye}$$

$$E_{intensity} = -\frac{c_5}{area} \int\int_{left\_iris\_area} \Phi_{intensity}(\vec{x})dA$$

$$-\frac{c_5}{area} \int\int_{right\_iris\_area} \Phi_{intensity}(\vec{x})dA$$

$$E_{valley} = \frac{c_5}{area} \int\int_{left\_iris\_area} \Phi_{valley}(\vec{x})dA$$

$$\frac{c_5}{area} \int\int_{right\_iris\_area} \Phi_{valley}(\vec{x})dA$$

$$E_{eye} = \frac{c_4}{length} \int_{left\_iris\_edge} \Phi_{eye}(\vec{x})ds$$

$$+\frac{c_4}{length} \int_{right\_iris\_edge} \Phi_{eye}(\vec{x})ds$$

The coefficients used are: $c_4=100$, $c_5=300$.

The iris centers are initially positioned, guided by the oval parameters. The valley potential is strong around the actual iris area and it draws the iris/eye template over a substantial distance. The update is by gradient descent which is a procedure that changes the parameters in such a manner that causes the strongest possible decrease in the $E_{eye\_total}$. The oval parameters are not allowed to change in this stage. Thus, only a change in the iris parameters will update the total energy value.

For the Iris-fitting sub-stage, the equations from the Iris-attracting stage and additional equations for each of the energy potentials are used. Also an internal energy term is introduced to prevent the iris radius from collapsing to a point The equations used are as follows:

$$E_{iris\_total} = E_{intensity\_total} + E_{vally\_total} + E_{eye\_total} + E_{internal}$$

$$E_{intensity\_total} = E_{intensity\_eye} + E_{intensity\_iris}$$

$$E_{valley\_total} = E_{valley\_eye} + E_{valley\_iris}$$

$$E_{eye\_total} = E_{eye\_eye} + E_{eye\_iris}$$

$E_{intensity\_eye}$ same as in Iris-attracting stage $$E_{intensity\_iris} = -\frac{2\times c_9}{r\times length} \int_{left\_iris\_edge} \Phi_{intensity}(\vec{x})ds$$

$$+\frac{2\times c_9}{r\times area} \int\int_{left\_iris\_area} Phi_{intensity}(\vec{x})dA$$

$E_{valley\_eye}$ same as in Iris-attracting stage $$E_{valley\_iris} = \frac{2\times c_8}{r\times length} \int_{left\_iris\_edge} \Phi_{valley}(\vec{x})ds$$

$$-\frac{2\times c_8}{r\times area} \int\int_{left\_iris\_area} Phi_{valley}(\vec{x})dA$$

$E_{eye\_eye}$ same as in Iris-attracting stage $$E_{eye\_iris} = \frac{c_7}{length} \int_{left\_iris\_edge} \Phi_{eye}(\vec{x})ds$$

$$E_{internal} = k_4 e^{-\beta_3 r}$$

The coefficients used are: $c_4=100$, $c_5=300$, $c_7=200$, $c_8=100$, $c_9=150$, $k_4=80000$, $\beta_3=0.6$.

The iris-fitting sub-stage uses the intensity image potential $\phi_{intensity}$, the valley image potential $\phi_{valley}$, the eye image potential $\phi_{eye}$ to fit the iris template to the actual image. The $k_4$ term is an outward force that prevents the radius of the iris from becoming too small. The darkness of the iris area from the intensity image and the brightness of the iris area from the valley image potential along with the iris edge information from the eye image potential will guide the fitting of the iris template to the image. The eye parameters a, b, c (these are constants controlling the boundary of the eye) are scaled with respect to the radius of the iris and these parameters are used to clip the iris disc to a partial disc. The only parameters allowed to change in this stage are both the iris centers and the scale of the iris template. The parameters are updated by gradient descent FIG. 10a through 10i shows the outcome of the iris-attracting and -fitting sub-stages.

Figure 10:
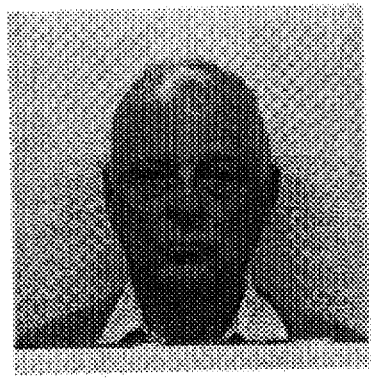
Figure 10:
Figure 10:
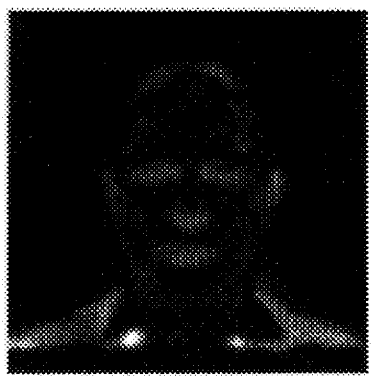
Figure 10:
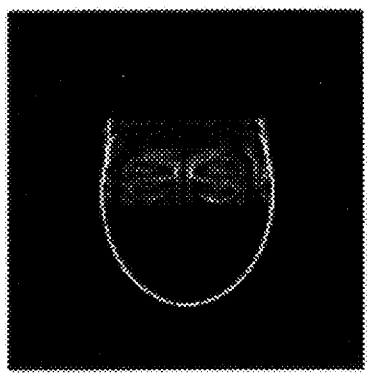
Figure 10:
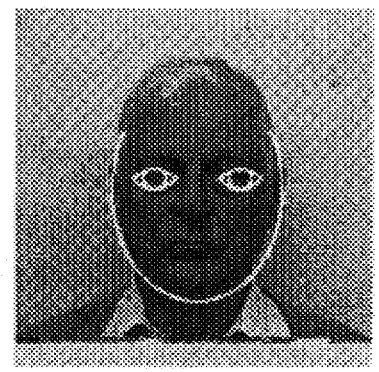
Figure 10:
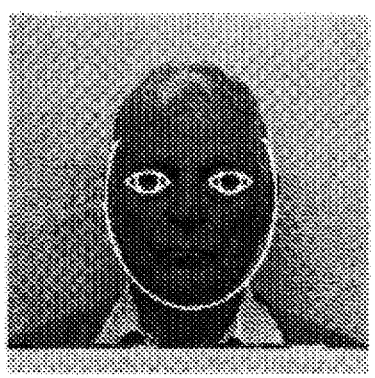
Figure 10:
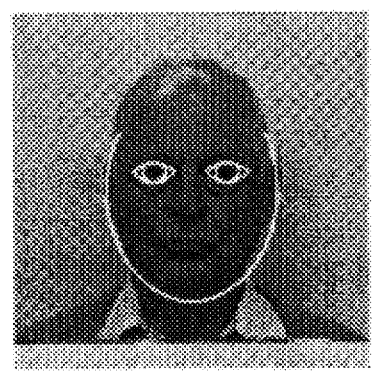
Figure 10:
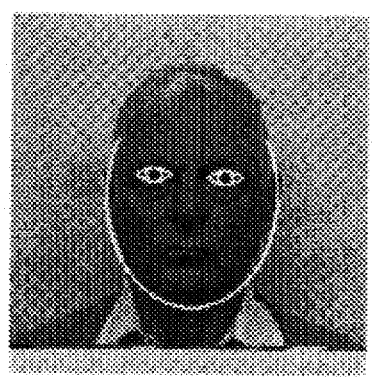
Figure 10:
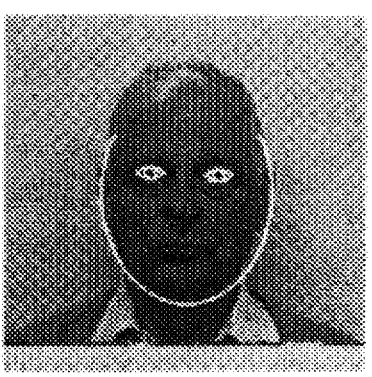

FIG. 10a shows an original image. FIG. 10b shows an edge potential of that image. FIG. 10c shows the valley potential. FIG. 10d shows the edge potential shown just for eyes. FIGS. 10e through 10g shows the iris attracting sub-stage. FIGS. 10h through 10i shows the substage for iris-fitting.

Finding the Mouth

Figure 11:
Figure 11:
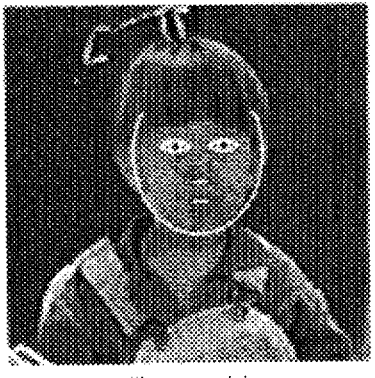
Figure 11:
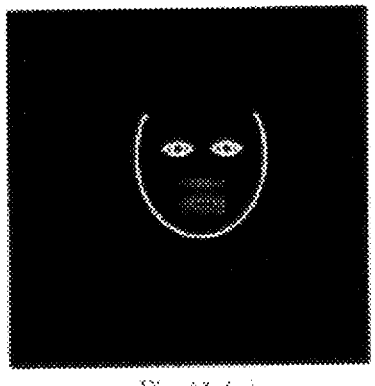
Figure 11:
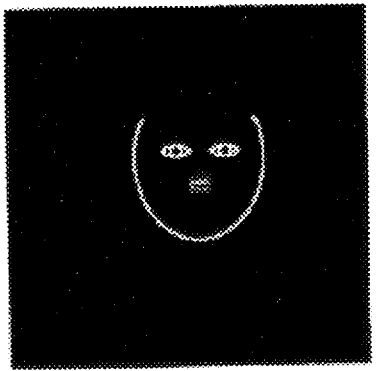

Stage 150 of FIG. 2 covers finding the mouth as the next stage. After finding both iris centers, a vertical axis half way between the two irises is computed. The search area for the mouth is determined by a rectangular region of width $$\frac{4}{3} f_o.$$

centered at the vertical axis, and of height $0.5f_b$ centered at $0.5f_b$ from the bottom of the oval. This area is large enough so that the mouth is guaranteed to be within this region. An averaging filter which takes the average of the numbers it is processing, with mask size of (31×5) is convolved with the mouth area to produce the mouth image potential $\phi_{mouth}$ which is just the output from applying the averaging filter above. From the mouth image potential, each horizontal line is summed and the one with the maximum sum is selected as the position of the center of the mouth. FIG. 11 to be discussed in the next section details the outcome of locating the center of the mouth.

Finding the Nose

After-the mouth is found, the next stage is finding the nose 160 FIG. 2. Here, an area for the nose is determined guided by the vertical axis, the mouth, and the eye. The nose is searched for in a rectangular region bounded vertically by the middle 60% of the distance between the eyes and the mouth, and horizontally by the 2 eye-centers. Similar to the mouth stage, an averaging filter with mask size (31×5)) is applied to the nose area to produce a nose image potential $\phi_{nose}$. From the nose image potential, each horizontal line is summed and the one with the maximum is selected as the position of the bottom of the nose. The size of the mask will vary with the size of the oval.

FIGS. 11a through 11d shows the outcome of locating the center of the mouth, and the bottom of the nose. FIG. 11a shows an original image. FIG. 11b shows a final mouth and nose-fit over the original image. FIG. 11c shows an enlarged mouth potential from the image. FIG. 11d shows an enlarged nose potential from the image.

STEP 2: COMPUTE FACIAL FEATURE RATIOS

The results obtained from facial feature detection, Step 1 of FIG. 1, which encompass stages 110 through 170 in FIG. 2 are categorized in tables. Tables 1 and 2 show the positions detected for the various primary facial features. For the columns labelled oval, leye, reye, nose, mouth, chin, the values of x and y represent the coordinates that are measured in pixel units. The values of $f_a$ and $f_b$ in the column labelled oval represent the measured half-lengths of the oval in pixel units. Tables 3 and 4 indicate human evaluation of these results. All the faces used in these experiments are shown with their facial feature fits in FIGS. 19 through 22. FIGS. 19a through 19y show the original images for the baby class. FIGS. 20a through 20y show the final fit for each of the images of FIGS. 19a through 19y. FIGS. 21a through 21v show the original images for the adult and senior class. FIGS. 22a through 22v show the final fit for each of the images of FIGS. 21a through 21v. These evaluations are used to decide which data to include in evaluating whether a ratio is appropriate for classification.

TABLE 1

Results of the facial feature data found for baby class.

| | oval | | leye | | reye | | nose | | mouth | | chin | | oval | |
|---|---|---|---|---|---|---|---|---|---|---|---|---|---|---|
| subject | x | y | x | y | x | y | x | y | x | y | x | y | $f_a$ | $f_b$ |
| baby01 | 140 | 105 | 113 | 106 | 165 | 110 | 139 | 73 | 139 | 52 | 146 | 19 | 61 | 85 |
| baby02 | 143 | 118 | 114 | 139 | 174 | 135 | 144 | 98 | 144 | 76 | 142 | 40 | 59 | 77 |
| baby03 | 134 | 145 | 117 | 152 | 151 | 152 | 134 | 128 | 134 | 114 | 132 | 93 | 43 | 57 |
| baby04 | 131 | 125 | 109 | 138 | 151 | 136 | 130 | 109 | 130 | 92 | 131 | 64 | 46 | 60 |
| baby05 | 140 | 119 | 120 | 131 | 164 | 131 | 142 | 97 | 142 | 84 | 142 | 55 | 49 | 65 |
| baby08 | 122 | 122 | 92 | 120 | 146 | 120 | 119 | 80 | 119 | 58 | 113 | 21 | 72 | 100 |
| baby10 | — | — | 110 | 115 | 166 | 115 | 138 | 79 | 138 | 58 | — | — | — | — |
| baby12 | 129 | 95 | 104 | 104 | 154 | 100 | 129 | 70 | 129 | 49 | — | — | 64 | 84 |
| baby13 | 131 | 127 | 107 | 139 | 153 | 139 | 130 | 110 | 130 | 91 | — | — | 52 | 62 |
| baby14 | 95 | 149 | 73 | 157 | 115 | 155 | 94 | 127 | 94 | 110 | 83 | 86 | 49 | 65 |
| baby15 | — | — | 107 | 112 | 157 | 114 | 132 | 80 | 132 | 60 | — | — | — | — |
| baby16 | — | — | 114 | 135 | 158 | 133 | 136 | 105 | 136 | 89 | — | — | — | — |
| baby17 | 133 | 118 | 109 | 118 | 163 | 116 | 136 | 82 | 136 | 58 | — | — | 67 | 91 |
| baby18 | 142 | 125 | 116 | 137 | 168 | 137 | 142 | 99 | 142 | 75 | 144 | 37 | 61 | 85 |
| baby19 | — | — | 113 | 141 | 167 | 141 | 140 | 115 | 140 | 88 | — | — | — | — |
| baby20 | 136 | 121 | 114 | 118 | 158 | 122 | 136 | 93 | 136 | 74 | 129 | 54 | 52 | 70 |
| baby21 | — | — | 100 | 137 | 152 | 139 | 126 | 108 | 126 | 85 | — | — | — | — |
| baby22 | 131 | 138 | 112 | 149 | 152 | 147 | 132 | 120 | 132 | 105 | — | — | 48 | 66 |
| baby24 | 142 | 123 | 125 | 129 | 177 | 131 | 151 | 100 | 151 | 84 | 152 | 44 | 57 | 79 |
| baby25 | — | — | 94 | 122 | 148 | 120 | 121 | 91 | 121 | 66 | — | — | — | — |
| b02 | — | — | 106 | 128 | 154 | 128 | 130 | 97 | 130 | 73 | — | — | — | — |
| b06 | — | — | 120 | 143 | 166 | 145 | 143 | 111 | 143 | 93 | 145 | 55 | 63 | 87 |
| b07 | 145 | 119 | 131 | 117 | 179 | 117 | 155 | 84 | 155 | 64 | — | — | 72 | 88 |
| b09 | — | — | 92 | 136 | 146 | 136 | 119 | 105 | 119 | 85 | — | — | — | — |
| b18 | — | — | 84 | 157 | 124 | 159 | 104 | 135 | 104 | 118 | — | — | — | — |

TABLE 2

Results of the facial feature data found for adult and senior classes.

| | oval | | leye | | reye | | nose | | mouth | | chin | | oval | |
|---|---|---|---|---|---|---|---|---|---|---|---|---|---|---|
| subject | x | y | x | y | x | y | x | y | x | y | x | y | $f_a$ | $f_b$ |
| snr01 | 131 | 117 | 97 | 115 | 159 | 119 | 128 | 65 | 128 | 49 | — | — | 73 | 103 |
| snr02 | 131 | 137 | 103 | 144 | 155 | 144 | 129 | 114 | — | — | — | — | 67 | 83 |
| snr03 | — | — | 96 | 138 | — | — | 123 | 111 | 123 | 89 | — | — | — | — |
| snr05 | — | — | 114 | 151 | 164 | 147 | 139 | 114 | 139 | 96 | — | — | — | — |
| snr06 | 123 | 128 | 101 | 129 | 143 | 131 | 122 | 105 | 122 | 87 | — | — | 50 | 66 |
| snr07 | 131 | 157 | — | — | — | — | 134 | 126 | 134 | 107 | — | — | 54 | 76 |
| snr10 | — | — | — | — | 159 | 155 | 134 | 116 | 134 | 97 | — | — | — | — |
| snr11 | 132 | 147 | 113 | 154 | 155 | 152 | — | — | 134 | 111 | — | — | 51 | 71 |
| snr15 | 128 | 149 | 105 | 158 | 147 | 160 | — | — | 126 | 100 | — | — | 60 | 84 |
| snr18 | 131 | 128 | 104 | 139 | 166 | 139 | 135 | 85 | 135 | 63 | — | — | 73 | 103 |
| s01 | 134 | 107 | 107 | 125 | 163 | 125 | 135 | 87 | 135 | 65 | 146 | 31 | 59 | 81 |
| s10 | 115 | 111 | 87 | 129 | 141 | 129 | 114 | 89 | 114 | 67 | 102 | 38 | 55 | 73 |
| s11 | — | — | 119 | 132 | 175 | 130 | 147 | 92 | 147 | 72 | — | — | — | — |
| s12 | 120 | 142 | 94 | 158 | 152 | 156 | 123 | 119 | 123 | 95 | 120 | 61 | 60 | 82 |
| adult01 | 129 | 136 | 95 | 147 | 163 | 149 | 129 | 100 | 129 | 70 | 131 | 20 | 81 | 113 |
| adult04 | 126 | 112 | 106 | 129 | 152 | 127 | 129 | 92 | 129 | 70 | 126 | 37 | 60 | 74 |
| a01 | — | — | 104 | 146 | 144 | 146 | 124 | 112 | 124 | 98 | 123 | 69 | 45 | 59 |
| a02 | 125 | 137 | 103 | 152 | 147 | 148 | 125 | 116 | 125 | 103 | 127 | 73 | 47 | 63 |

TABLE 2-continued

Results of the facial feature data found for adult and senior classes.

| | oval | | leye | | reye | | nose | | mouth | | chin | | oval | |
|---|---|---|---|---|---|---|---|---|---|---|---|---|---|---|
| subject | x | y | x | y | x | y | x | y | x | y | x | y | $f_a$ | $f_b$ |
| a04 | 132 | 140 | 110 | 153 | 150 | 155 | 130 | 121 | 130 | 111 | 133 | 80 | 49 | 59 |
| a06 | 139 | 132 | 118 | 152 | 158 | 152 | 138 | 116 | 138 | 103 | 140 | 76 | 41 | 53 |
| a12 | — | — | 123 | 136 | 159 | 132 | 141 | 104 | 141 | 92 | — | — | — | — |
| a19 | 126 | 153 | 107 | 170 | 151 | 168 | 129 | 142 | 129 | 124 | 128 | 94 | 47 | 59 |

TABLE 3

Results indicating how well the facial feature fits were for the baby class. The quality of these fits were judged by human inspection. An automatic procedure for this appears to be difficult to design.

| subject | oval | leye | reye | nose | mouth | chin | comments |
|---|---|---|---|---|---|---|---|
| baby01 | VG | VG | VG | VG | VG | VG | None |
| baby02 | VG | VG | VG | VG | VG | VG | None |
| baby03 | VG | VG | VG | VG | VG | VG | None |
| baby04 | VG | VG | VG | VG | VG | VG | None |
| baby05 | VG | G | G | VG | VG | VG | None |
| baby08 | VG | VG | VG | VG | VG | VG | +5 deg,OMF |
| baby10 | P | VG | VG | VG | VG | P | None |
| baby12 | VG | VG | VG | VG | VG | CNF,UO | Expr,OMF |
| baby13 | VG | VG | VG | VG | VG | CNF,UO | OMF |
| baby14 | VG | VG | VG | VG | VG | G | None |
| baby15 | P | VG | VG | VG | VG | P | None |
| baby16 | P | VG | VG | VG | VG | P | +2 deg |
| baby17 | VG | VG | VG | VG | VG | CNF,UO | +2 deg |
| baby18 | VG | VG | VG | VG | VG | G | None |
| baby19 | P | VG | VG | VG | VG | P | None |
| baby20 | VG | VG | VG | VG | VG | G | None |
| baby21 | P | G | G | VG | VG | P | None |
| baby22 | G | VG | VG | VG | VG | CNF,UO | None |
| baby24 | G | VG | VG | VG | VG | G | +3 deg |
| baby25 | P | G | VG | VG | VG | P | +3 deg |
| b02 | P | G | VG | VG | VG | P | None |
| b06 | P | G | G | VG | VG | VG | +1 deg |
| b07 | VG | VG | VG | VG | VG | P,UO | +1 deg |
| b09 | P | VG | VG | VG | VG | P | +1 deg |
| b18 | P | VG | VG | VG | VG | P | +2 deg |

VG = Very Good,
G = Good,
P = Poor,
UO = Use Oval to compute chin,
CNF = Chin Not Found
OMF = Oval Manually Found
+ x deg = amount of rotation of the face

TABLE 4

Results indicating how well the facial feature fits were for the adult and senior classes. The quality of these fits were judged by human inspection. An automatic procedure for this appears to be difficult to design.

| subject | oval | leye | reye | nose | mouth | chin | comments |
|---|---|---|---|---|---|---|---|
| snr01 | VG | VG | VG | G | VG | CNF,UO | None |
| snr02 | VG | VG | VG | VG | P | CNF,UO | None |
| snr03 | P | VG | P | VG | VG | P | None |
| snr05 | P | VG | G | VG | VG | P | +2 deg |
| snr06 | VG | VG | VG | VG | VG | CNF,UO | None |
| snr07 | VG | P | P | VG | VG | CNF,UO | None |
| snr10 | P | P | G | VG | VG | P | None |
| snr11 | G | G | VG | P | VG | CNF,UO | Expr |
| snr15 | VG | VG | G | P | VG | CNF,UO | None |
| snr18 | VG | VG | G | G | VG | CNF,UO | None |
| s01 | VG | VG | G | VG | VG | G | None |
| s10 | G | VG | VG | VG | VG | G | None |
| s11 | P | VG | VG | VG | VG | P | Expr |
| s12 | VG | G | VG | VG | VG | G | None |
| adult01 | G | VG | VG | VG | VG | VG | None |
| adult04 | VG | VG | VG | VG | VG | VG | None |
| a01 | P | VG | VG | VG | VG | VG | None |
| a02 | G | VG | VG | VG | VG | VG | None |
| a04 | VG | VG | VG | VG | VG | VG | Expr |
| a06 | G | G | G | G | VG | VG | None |
| a12 | P | VG | VG | G | VG | P | Expr |
| a19 | VG | VG | VG | VG | VG | VG | None |

VG = Very Good,
G = Good,
P = Poor,
UO = Use Oval to compute chin,
CNF = Chin Not Found
OMF = Oval Manually Found
+ x deg = amount of rotation of the face After the primary facial features have been located, they can be used to compute the ratios for age classification. Six ratios are evaluated as shown in FIGS. 12a through 12b. The term "abs()" signifies the absolute value within.

In FIG. 12a, RATIO 1 is $\dfrac{abs(leye(x) - reye(x))}{abs\left(\dfrac{leye(y) + reye(y)}{2} - nose(y)\right)}$ In FIG. 12b, RATIO 2 is $\dfrac{abs(leye(x) - reye(x))}{abs\left(\dfrac{leye(y) + reye(y)}{2} - mouth(y)\right)}$ In FIG. 12c, RATIO 3 is $\dfrac{abs(leye(x) - reye(x))}{abs\left(\dfrac{leye(y) + reye(y)}{2} - chin(y)\right)}$ In FIG. 12d, RATIO 4 is $\dfrac{abs\left(\dfrac{leye(y) + reye(y)}{2} - nose(y)\right)}{abs\left(\dfrac{leye(y) + reye(y)}{2} - mouth(y)\right)}$ In FIG. 12e, RATIO 5 is $\dfrac{abs\left(\dfrac{leye(y) + reye(y)}{2} - mouth(y)\right)}{abs\left(\dfrac{leye(y) + reye(y)}{2} - chin(y)\right)}$ In FIG. 12f, RATIO 6 is $\dfrac{abs\left(\dfrac{leye(y) + reye(y)}{2} - chin(y)\right)}{abs(tophead(y) - chin(y))}$ The measurements used in the ratio are presented in Tables 5 and 6. In these tables, "ochin" refers to oval-chin, which is calculated as the base of the initial oval. The term "ochin" refers to the chin position (x,y) gotten from the oval, where the x value is the same as the value of the oval_center (x) and the y value is computed by oval_center(y) - fb. For Tables 5 and 6, the vertical columns are calculated as follows:

$$eye\_avg\_y = \frac{leye + reye(y)}{2}$$

$$oval\_chin\_y = oval\_center(y) - fb$$

$$leye\text{-}reye = abs(leye(x) - reye(x))$$

$$eye\text{-}nose = abs(eye\_avg\_y - nose(y))$$

$$eye\text{-}mouth = abs(eye\_avg\_y - mouth(y))$$

$$eye\text{-}chin = abs(eye\_avg\_y - chin(y))$$

$$eye\text{-}ochin = abs(eye\_avg\_y - oval\_chin\_y)$$

In the case of baby01, the vertical columns from table 5 is as follows:

$$eye\_avg\_y = (106 + 110)/2 = 108$$

$$oval\_chin\_y = 105 - 85 = 20$$

$$leye\text{-}reye = abs(113 - 165) = 52$$

$$eye\text{-}nose = abs(108 - 73) = 35$$

$$eye\text{-}mouth = abs(108 - 52) = 56$$

$$eye\text{-}chin = abs(108 - 19) = 89$$

$$eye\text{-}ochin = abs(108 - 20) = 88$$

TABLE 5

Intermediate calculations for the ratio calculations for baby class.

| subject | eye_avg_y | oval_chin_y | leye-reye | eye-nose | eye-mth | eye-chin | eye-ochin |
|---------|-----------|-------------|-----------|----------|---------|----------|-----------|
| baby01  | 108 | 20 | 52 | 35 | 56 | 89 | 88 |
| baby02  | 137 | 41 | 60 | 39 | 61 | 97 | 96 |
| baby03  | 152 | 88 | 34 | 24 | 38 | 59 | 64 |
| baby04  | 137 | 65 | 42 | 28 | 45 | 73 | 72 |
| baby05  | 131 | 54 | 44 | 34 | 47 | 76 | 77 |
| baby08  | 120 | 22 | 54 | 40 | 62 | 99 | 98 |
| baby10  | 115 | —  | 56 | 36 | 57 | —  | —  |
| baby12  | 102 | 11 | 50 | 32 | 53 | —  | 91 |
| baby13  | 139 | 65 | 46 | 29 | 48 | —  | 74 |
| baby14  | 156 | 84 | 42 | 29 | 46 | 70 | 72 |
| baby15  | 113 | —  | 50 | 33 | 53 | —  | —  |
| baby16  | 134 | —  | 44 | 29 | 45 | —  | —  |
| baby17  | 117 | 27 | 54 | 35 | 59 | —  | 90 |
| baby18  | 137 | 40 | 52 | 38 | 62 | 100 | 97 |
| baby19  | 141 | —  | 54 | 26 | 53 | —  | —  |
| baby20  | 120 | 51 | 44 | 27 | 46 | 66 | 69 |
| baby21  | 138 | —  | 52 | 30 | 53 | —  | —  |
| baby22  | 148 | 72 | 40 | 28 | 43 | —  | 76 |
| baby24  | 130 | 44 | 52 | 30 | 46 | 86 | 86 |
| baby25  | 121 | —  | 54 | 30 | 55 | —  | —  |
| b02     | 128 | —  | 48 | 31 | 55 | —  | —  |
| b06     | 144 | —  | 46 | 33 | 51 | 89 | —  |
| b07     | 117 | 31 | 48 | 33 | 53 | —  | 86 |
| b09     | 136 | —  | 54 | 31 | 51 | —  | —  |
| b18     | 158 | —  | 40 | 23 | 40 | —  | —  |

TABLE 6

Intermediate calculations for the ratio calculations for adult and senior classes.

| subject | eye_avg_y | oval_chin_y | leye-reye | eye-nose | eye-mth | eye-chin | eye-ochin |
|---------|-----------|-------------|-----------|----------|---------|----------|-----------|
| snr01 | 117 | 14 | 62 | 52 | 68 | —  | 103 |
| snr02 | 144 | 54 | 52 | 30 | —  | —  | 90  |
| snr03 | —   | —  | —  | —  | —  | —  | —   |
| snr05 | 149 | —  | 50 | 35 | 53 | —  | —   |
| snr06 | 130 | 62 | 42 | 25 | 43 | —  | 68  |
| snr07 | —   | 81 | —  | —  | —  | —  | —   |
| snr10 | —   | —  | —  | —  | —  | —  | —   |
| snr11 | 153 | 76 | 42 | —  | 42 | —  | 77  |
| snr15 | 159 | 65 | 42 | —  | 59 | —  | 94  |
| snr18 | 139 | 25 | 62 | 54 | 76 | —  | 114 |
| s01   | 125 | 26 | 56 | 38 | 60 | 94 | 99  |
| s10   | 129 | 38 | 54 | 40 | 62 | 91 | 91  |
| s11   | 131 | —  | 56 | 39 | 59 | —  | —   |

TABLE 6-continued

Intermediate calculations for the ratio calculations for adult and senior classes.

| subject | eye_avg_y | oval_chin_y | leye-reye | eye-nose | eye-mth | eye-chin | eye-ochin |
|---|---|---|---|---|---|---|---|
| s12 | 157 | 60 | 58 | 38 | 62 | 96 | 97 |
| adult01 | 148 | 23 | 68 | 48 | 78 | 128 | 125 |
| adult04 | 128 | 38 | 46 | 36 | 58 | 91 | 90 |
| a01 | 146 | — | 40 | 34 | 48 | 77 | — |
| a02 | 150 | 74 | 44 | 34 | 47 | 77 | 76 |
| a04 | 154 | 81 | 40 | 33 | 43 | 74 | 73 |
| a06 | 152 | 79 | 40 | 36 | 49 | 76 | 73 |
| a12 | 134 | — | 36 | 30 | 42 | — | — |
| a19 | 169 | 94 | 44 | 27 | 45 | 75 | 75 |

Tables 7 and 8 show the calculated ratios. Ratio 6 is not included here but is discussed later. Ratios 3 and 5 use the chin and thus have corresponding ratios 3b and 5b for when the chin is obtained from the initial oval. In these tables, "ochin" refers to oval-chin. For Tables 7 and 8, the Ratios are calculated as described in the FIG. 12 equations.

In the case of baby 01, the vertical columns from Table 7 are calculated as follows:

$$\text{Ratio 1} = 52/35 = 1.4857$$

$$\text{Ratio 2} = 52/56 = 0.9286$$

$$\text{Ratio 3a} = 52/89 = 0.5843$$

-continued $$\text{Ratio 3b} = 52/88 = 0.5909$$

$$\text{Ratio 4} = 35/56 = 0.6250$$

$$\text{Ratio 5a} = 56/89 = 0.6292$$

$$\text{Ratio 5b} = 56/88 = 0.6394$$

TABLE 7

Results of the ratio computation with real images for baby class.

| subject | Ratio 1 nose-T | Ratio 2 mth-T | Ratio 3a chin-T | Ratio 3b ochin-T | Ratio 4 e-n-m | Ratio 5A e-m-c | Ratio 5b e-m-ochin |
|---|---|---|---|---|---|---|---|
| baby01 | 1.4857 | 0.9286 | 0.5843 | 0.5909 | 0.6250 | 0.6292 | 0.6364 |
| baby02 | 1.5385 | 0.9836 | 0.6186 | 0.6250 | 0.6393 | 0.6289 | 0.6354 |
| baby03 | 1.4167 | 0.8947 | 0.5763 | 0.5313 | 0.6316 | 0.6441 | 0.5938 |
| baby04 | 1.5000 | 0.9333 | 0.5753 | 0.5833 | 0.6222 | 0.6164 | 0.6250 |
| baby05 | 1.2941 | 0.9362 | 0.5789 | 0.5714 | 0.7234 | 0.6184 | 0.6104 |
| baby08 | 1.3500 | 0.8710 | 0.5455 | 0.5510 | 0.6452 | 0.6263 | 0.6327 |
| baby10 | 1.5556 | 0.9825 | — | — | 0.6316 | — | — |
| baby12 | 1.5625 | 0.9434 | — | 0.5495 | 0.6038 | — | 0.5824 |
| baby13 | 1.5862 | 0.9583 | — | 0.6216 | 0.6042 | — | 0.6486 |
| baby14 | 1.4483 | 0.9130 | 0.6000 | 0.5833 | 0.6304 | 0.6571 | 0.6389 |
| baby15 | 1.5152 | 0.9434 | — | — | 0.6226 | — | — |
| baby16 | 1.5172 | 0.9778 | — | — | 0.6444 | — | — |
| baby17 | 1.5429 | 0.9153 | — | 0.6000 | 0.5932 | — | 0.6556 |
| baby18 | 1.3684 | 0.8387 | 0.5200 | 0.5361 | 0.6129 | 0.6200 | 0.6392 |
| baby19 | 2.0769 | 1.0189 | — | — | 0.4906 | — | — |
| baby20 | 1.6296 | 0.9565 | 0.6667 | 0.6377 | 0.5870 | 0.6970 | 0.6667 |
| baby21 | 1.7333 | 0.9811 | — | — | 0.5660 | — | — |
| baby22 | 1.4286 | 0.9302 | — | 0.5263 | 0.6512 | — | 0.5658 |
| baby24 | 1.7333 | 1.1304 | 0.6047 | 0.6047 | 0.6522 | 0.5349 | 0.5349 |
| baby25 | 1.8000 | 0.9818 | — | — | 0.5455 | — | — |
| b02 | 1.5484 | 0.8727 | — | — | 0.5636 | — | — |
| b06 | 1.3939 | 0.9020 | 0.5169 | — | 0.6471 | 0.5730 | — |
| b07 | 1.4545 | 0.9057 | — | 0.5581 | 0.6226 | — | 0.6163 |
| b09 | 1.7419 | 1.0588 | — | — | 0.6078 | — | — |
| b18 | 1.7391 | 1.0000 | — | — | 0.5750 | — | — |
| Sum | 38.9609 | 23.7579 | 6.3870 | 8.6702 | 15.3384 | 6.8453 | 9.2819 |
| Num Elements | 25 | 25 | 11 | 15 | 25 | 11 | 15 |
| Average | 1.55844 | 0.95032 | 0.58064 | 0.57801 | 0.61354 | 0.62230 | 0.61879 |
| Std Deviation | 0.16851 | 0.06086 | 0.04138 | 0.03434 | 0.04352 | 0.03988 | 0.03469 |
| Variance | 0.02840 | 0.00370 | 0.00171 | 0.00118 | 0.00189 | 0.00159 | 0.00120 |

TABLE 8

Results of the ratio computation with real images for adult and senior classes.

| subject | Ratio 1 nose-T | Ratio 2 mth-T | Ratio 3a chin-T | Ratio 3b ochin-T | Ratio 4 e-n-m | Ratio 5A e-m-c | Ratio 5b e-m-ochin |
|---|---|---|---|---|---|---|---|
| snr01 | 1.1923 | 0.9118 | — | 0.6019 | 0.7647 | — | 0.6602 |
| snr02 | 1.7333 | — | — | 0.5778 | — | — | — |
| snr03 | — | — | — | — | — | — | — |
| snr05 | 1.4286 | 0.9434 | — | — | 0.6604 | — | — |
| snr06 | 1.6800 | 0.9767 | — | 0.6176 | 0.5814 | — | 0.6324 |
| snr07 | — | — | — | — | — | — | — |
| snr10 | — | — | — | — | — | — | — |
| 15snr11 | — | 1.0000 | — | 0.5455 | — | — | 0.5455 |
| snr15 | — | 0.7119 | — | 0.4468 | — | — | 0.6277 |
| snr18 | 1.1481 | 0.8158 | — | 0.5439 | 0.7105 | — | 0.6667 |
| s01 | 1.4737 | 0.9333 | 0.5957 | 0.5657 | 0.6333 | 0.6383 | 0.6061 |
| s10 | 1.3500 | 0.8710 | 0.5934 | 0.5934 | 0.6452 | 0.6813 | 0.6813 |
| s11 | 1.4359 | 0.9492 | — | — | 0.6610 | — | — |
| s12 | 1.5263 | 0.9355 | 0.6042 | 0.5979 | 0.6129 | 0.6458 | 0.6392 |
| adult01 | 1.4167 | 0.8718 | 0.5313 | 0.5440 | 0.6154 | 0.6094 | 0.6240 |
| adult04 | 1.2778 | 0.7931 | 0.5055 | 0.5111 | 0.6207 | 0.6374 | 0.6444 |
| a01 | 1.1765 | 0.8333 | 0.5195 | — | 0.7083 | 0.6234 | — |
| a02 | 1.2941 | 0.9362 | 0.5714 | 0.5789 | 0.7234 | 0.6104 | 0.6184 |
| a04 | 1.2121 | 0.9302 | 0.5405 | 0.5479 | 0.7674 | 0.5811 | 0.5890 |
| a06 | 1.1111 | 0.8163 | 0.5263 | 0.5479 | 0.7347 | 0.6447 | 0.6712 |
| a12 | 1.2000 | 0.8571 | — | — | 0.7143 | — | — |
| a19 | 1.6296 | 0.9778 | 0.5867 | 0.5867 | 0.6000 | 0.6000 | 0.6000 |
| Sum | 23.2862 | 16.0644 | 5.5745 | 8.4071 | 10.7537 | 6.2718 | 8.8060 |
| Num Elements | 17 | 18 | 10 | 15 | 16 | 10 | 14 |
| Average | 1.36977 | 0.89247 | 0.55745 | 0.56047 | 0.67210 | 0.62718 | 0.62900 |
| Std Deviation | 0.15074 | 0.05675 | 0.03475 | 0.02681 | 0.05445 | 0.02700 | 0.02971 |
| Variance | 0.02272 | 0.00322 | 0.00121 | 0.00072 | 0.00296 | 0.00073 | 0.10088 |

Each ratio is now to be evaluated individually for its use in age classification. In Tables 7 and 8, Ratio 6 was not tabulated. For the other five ratios, the ratios were recomputed after dropping the data which was evaluated as unfavorable due to facial expression or rotation of the head. The subjects that were dropped are: baby08, baby24, baby25, b18, snr05, snr11, s11, a04, and a12.

For the five ratios, the individual column data from Tables 7 and 8 are used to obtain classification thresholds. These thresholds are calculated using to the following algorithm of Ohzu N. (1980), "An Automatic Threshold Selection Method Based on Discriminant and Least Squares Criteria", The Transactions of The Institute of Electronics, Information and Communication Engineers, vol. J63-D no. 4., for automatic threshold detection in bi-modal distribution Assume the histogram levels 1,2, . . . , L. There exists an threshold value k which will optimally segement two groups of histogram. Now, we assume the resulting statistics of these two groups as follows:

|  | Group 1 | Group 2 |
|---|---|---|
| Accumulated histogram values: (total no. of pixel in each group) | n__1(k) | n__2(k) |
| Mean of the intensities/group: | m__1(k) | m__2(k) |
| Variance of each group: | V__1(k) | V__2(k) |
| The mean of the whole image: | m__t | |

Then the total inner variance: $V\_inner = n\_1 * V\_1 + n\_2 * V\_2$
the total intra variance: $V\_intra = n\_1 * (m\_1 - m\_t)^2 + n\_2 * (m\_2 - m\_t)^2$
Obtain the "max(V__intra/V__inner)", the best k values will be solved.

The use of these thresholds for each ratio is now to be discussed.

RATIO 1: nose-T

Ratio 1 is (distance between two eyes : nose to midway point of eyes). Features found from stages 110 through 170 of FIG. 2 are used for this ratio. Table 9 shows the results of the ratio computation with real images, indicating that it is possible to computationally distinguish between baby and non-baby images.

TABLE 9

Results of the ratio computation with real images, indicating that it is possible to computationally distinguish between baby and non-baby images.

| Ratio 1 | Baby | Adult |
|---|---|---|
| Sum | 32.3384 | 18.0096 |
| Num of Elements | 21 | 13 |
| Average | 1.53993 | 1.38535 |
| Std Deviation | 0.16001 | 0.15751 |
| Variance | 0.02560 | 0.02481 |

The threshold found by the method of the algorithm listed above for Ratio 1 is 1.48. The threshold correctly classifies 14 out of 21 babies (67%) and 9 out of 13 adults (69%). The location of the nose position is tricky because of the nose protrusion. Nevertheless, a good nose position is acquired consistently for the faces in our database. Although a higher classification percentage is desired, this ratio provides a reasonably reliable classification.

RATIO 2: mouth-T

Ratio 2 is (distance between two eyes: mouth to midway point of eyes). Features found from stages 1 through 6 of FIG. 2 are used for this ratio. Table 10 shows the results of the ratio computation with real images, indicating that it is possible to computationally distinguish between baby and non-baby images.

TABLE 10

Results of the ratio computation with real images, indicating that it is possible to computationally distinguish between baby and non-baby images.

| Ratio 2 | Baby | Adult |
| --- | --- | --- |
| Sum | 19.7747 | 11.3845 |
| Num of Elements | 21 | 13 |
| Average | 0.94165 | 0.87573 |
| Std Deviation | 0.00232 | 0.05992 |
| Variance | 0.00232 | 0.00359 |

The threshold found by the method of the algorithm for automatic threshold detection in bi-modal distribution, for Ratio 2 is 0.91. This threshold correctly classifies 16 out of 21 babies (76%) and 7 out of 13 adults (54%). This appears to be the ratio that can be measured reliably and also in providing reliable classification.

RATIO 3: chin-T

Ratio 3 is (distance between two eyes: chin to midway point of eyes). This ratio makes use of features found by stages 1 through 5 of FIG. 2. Table 11 shows the results of the ratio computation with real images, indicating that it is possible to computationally distinguish between baby and non-baby images.

TABLE 11

Results of the ratio computation with real images, indicating that it is possible computationally distinguish between baby and non-baby images.

| Ratio 3a | Baby | Adult |
| --- | --- | --- |
| Sum | 5.2369 | 5.0340 |
| Num of Elements | 9 | 9 |
| Average | 0.58188 | 0.55933 |
| Std Deviation | 0.04347 | 0.03614 |
| Variance | 0.00189 | 0.00131 |

The threshold found by the method of the algorithm for automatic threshold detection in bi-modal distribution, for Ratio 3a is 0.57. This threshold correctly classifies 7 out of 9 babies (78%) and 4 out of 9 adults (44%). Localizing the chin is difficult to perform with consistency, due to changes in shading and shadowing, multiple chins, the possibility of an open jaw, and the possibility of facial hair. The classification result based on this ratio should not be ruled out as a possible candidate. Several factors could have contributed to this result. The shape of the chin varies greatly from a person to person which allows diverse results in the measurements of this ratio.

Table 12shows the results of the ratio computation with real images, indicating that it is possible to computationally distinguish between baby and non-baby images.

TABLE 12

Results of the ratio computation real images, indicating that it is possible to computationally distinguish between baby and non-baby images.

| Ratio 3b | Baby | Adult |
| --- | --- | --- |
| Sum | 7.5145 | 7.3137 |
| Num of Elements | 13 | 13 |
| Average | 0.57804 | 0.56259 |
| Std Deviation | 0.03535 | 0.02781 |
| Variance | 0.00125 | 0.00077 |

The threshold found by the method of the algorithm for automatic threshold detection in bi-modal distribution, for Ratio 3b is 0.53. This threshold correctly classifies 12 out of 13 babies (92%) and 2 out of 13 adults (15%). Although the chin is more difficult to find, the oval that fits the face is found more easily. The drawback to the oval is that the chin position found from the oval may not be an exact fit because the oval finds the best fit including the sides of the face. The data supports the fact that ratio 3b is not bi-modal: even the averages are very similar.

RATIO 4: eye-nose: eye-mouth

Ratio 4 is (Nose to midway point of eyes: mouth to midway point of eyes). This ratio uses features from stages 1 through 7 of FIG. 2. Table 13 shows the results of the ratio computation with real images, indicating that it is possible to computationally distinguish between baby and non-baby images.

TABLE 13

Results of the ratio computation with real images, indicating that it is possible to computationally distinguish between baby and non-baby images.

| Ratio 4 | Baby | Adult |
| --- | --- | --- |
| Sum | 12.9206 | 7.9505 |
| Num of Elements | 21 | 12 |
| Average | 0.61527 | 0.66254 |
| Std Deviation | 0.04292 | 0.04942 |
| Variance | 0.00184 | 0.00244 |

The threshold found by the the method of the algorithm for automatic threshold detection in bi-modal distribution, for Ratio 4 is 0.62. This threshold correctly classifies 8 out of 21 babies (38%) and 8 out of 12 adults (67%).

RATIO 5: eye-mouth: eye-chin

Ratio 5 is (mouth to midway point of eyes: chin to midway point of eyes). This ratio uses features from stages 1 through 6 of FIG. 2. Table 14 shows the results of the ratio computation with real images, indicating that it is possible to computationally distinguish between baby and non-baby images.

TABLE 14

Results of the ratio computation with real images, indicating that it is possible to computationally distinguish between baby and non-baby images.

| Ratio 5a | Baby | Adult |
| --- | --- | --- |
| Sum | 5.6842 | 5.6907 |
| Num of Elements | 9 | 9 |
| Average | 0.63157 | 0.63230 |
| Std Deviation | 0.03173 | 0.02341 |
| Variance | 0.00101 | 0.00055 |

The threshold found by the method of the algorithm for automatic threshold detection in bi-modal distribution, for Ratio 5a is 0.64. This threshold correctly classifies 6 out of 9 babies (67%) and 3 out of 9 adults (33%). This ratio also has the chin location problem. This ratio can best be used when the chin is located in a more accurate manner. The data supports the fact that ratio 3b is not bi-modal: even the averages are very similar.

Table 15 shows the results of the ratio computation with real images, indicating that it is possible to computationally distinguish between baby and non-baby images.

TABLE 15

Results of the ratio computation with real images, indicating that it is possible to computationally distinguish between baby and non-baby images.

| Ratio 5b | Baby | Adult |
| --- | --- | --- |
| Sum | 8.1143 | 7.6715 |
| Num of Elements | 13 | 12 |
| Average | 0.62418 | 0.63929 |
| Std Deviation | 0.02833 | 0.02743 |
| Variance | 0.00080 | 0.00075 |

The threshold found by the method of the algorithm for automatic threshold detection in bi-modal distribution, for Ratio 5b is 0.63. This threshold correctly classifies 6 out of 13 babies (46%) and 7 out of 12 adults (58%). The oval chin is more consistently acquired but also suffers from the overall initial oval fitting. The data supports the fact that ratio 3b is not bi-modal; even the averages are very similar. The classification from this ratio with a better oval fit will improve its performance.

RATIO 6: eye-chin: top_head-chin

Ratio 6 is the height of the eyes within the top and bottom head-margins. For this ratio, it is not practical to obtain the true top of the head, hence, the virtual top of the head is used. This ratio makes use of features found in stages 1 through 5 of FIG. 2. This is the most reliable of the ratios, if the top of the head could be found. It has low intraclass variance, and high interclass variance. However, our method of measurement of the virtual top of the head is not consistently correct when the hair lies around the ears, whether or not the person is bald, and to variation in the actual shape of the lower part of the head. This measurement could be improved with better methods to estimate hair configurations.

Between all the ratios, ratio 1 is the most promising ratio. This ratio uses features which are not affected by any facial expressions or facial motions. However, it too is subject to imprecise localization. If made robust to shading, shadowing, and occlusion effects, this ratio can be improved to serve as a good classifier.

Ratios 1, 2, and 3 can suffer if the face is rotated in depth, and as such some measure may need to be adopted to compensate for this rotation, before the ratios are computed. Ratios 4, 5, and 6 are more consistently correct when this occurs. Enhancement can occur by combining several ratios to make the final ratio classification. Such combination could be based on statistical analysis.

STEP 3: COMPUTE WRINKLE ANALYSIS

Finding Wrinkles

Once the primary features of Steps 1 and 2 of FIG. 1 have been found for the face, the wrinkle geography map of FIG. 13 is used to determine where snakelets should be dropped to search for wrinkles. FIG. 13 shows a wrinkle geography map with the regions that are to be searched for facial wrinkles, after the eyes, nose, mouth, chin and sides of the face have been located.

Since the resolution of a 256×256 image does not capture any wrinkle information, it is necessary to zoom in to the areas depicted by the wrinkle geography map of FIG. 13 to capture further detail. For now, to prove our concept, the zooming-in process is accomplished manually.

FIG. 14a and FIG. 14b, respectively depicts the relationship of a zoomed-in 256×256 image of size 256×256 to the original 256×256 image. With an actively controlled zoom lens, the zooming-in task could be made automatic. Another possibility is to take higher resolution images at the outset and search for wrinkles in the areas depicted by the wrinkle geography map of FIG. 13. Recently, commercially available high resolution cameras (1280×1024) instead of 256× 256, have become available from manufacturers such as Kodak.

Possible Strategies for Finding and Analyizing Wrinkles

Once an image (zoomed-in) in which the presence or absence of wrinkles is to be determined has been obtained, the choices outlined at the start of the face analysis stages can be re-applied. That is, one option is to treat the whole image as an input vector and conduct an algebraic analysis of the vector space to achieve classification into wrinkle and non-wrinkled areas.

The other option discussed earlier is to detect individual features (in this case, individual wrinkle-candidates) and conduct geometric analysis of them to confirm whether these features are wrinkles or not. As an embodiment of the principles of geometric feature analysis, one could also examine an individual wrinkle-candidate for its curvature and how deeply it is embedded in the skin. Another embodiment would be to perform a match between a deformable template of a wrinkle and the image.

The embodiment used here is one where we simply confirm that the candidates for pieces of wrinkle analysis are not all lying on just one underlying curve. As such, if all the candidates for wrinkles-pieces lie on one curve (with very few outliers), the candidates are not labelled as wrinkles. In this manner, curves arising from shading marks, or noisy specks of skin, are not mistakenly labelled as wrinkles.

Steps for Detection and Classification of Wrinkle-Candidates.

First, snakelets are dropped in random orientations along the nodes of a grid using the raw intensity image as the potential for the snakelets. The bounding region for the grid is chosen by the areas shown in the wrinkle geography map of FIG. 13 according to human visual inspection.

Steps for Detection of Wrinkle-Candidates

When these snakelets have stabilized those snakelets that have found shallow valleys are eliminated. A shallow valley is detected according to the following: For each point in a snakelet, the directional derivative (of the raw image intensity) taken orthogonal to the snakelet curve is computed.

FIG. 15 shows the directional derivative orthogonal to the snakelet curve for each side of the snakelel These are summed separately for each side of the snakelet and normalized for the number of points in the snakelet, to obtain two sums that indicate the steepness of the valley the snakelet is occupying. If these steepness sums do not exceed some pre-selected threshold, the snakelet is eliminated. In this manner, only those snakelets that lie in a deep enough intensity valley survive. The deep intensity valleys correspond to narrow and deep wrinkles. Note that the relationship between the depth of a winkle and the depth of the intensity valley is fortuitous: shading effects cause deeper wrinkles to appear darker in their brightness.

An algorithm useful wrinkle-candidate detection is as follows:

```
for all snakelets {
    Sum1 = 0; Sum2 = 0;
    for each snakelet point SP_i {
        /* SP_i(x, y) = current point under consideration */
        /* Find orthogonal direction */
        θ = tan^-1|(SP_{i-1}(y) - SP_{i+1}(y))/(SP_{i-1}(y) - SP_{i+1}(y))|;
        Ortho_Theta = θ + π/2;      /* in radians */
```

```
        /* Get the value of directional derivative of the Ortho_Theta
           k geometric distance away to ensure wide enough band. */
        V₁(x) = SP₁(x) - cos( Ortho_Theta) * k;
        V₁(y) = SP₁(y) - sin( Ortho_Theta) * k;
        V₂(x) = SP₁(x) + cos( Ortho_Theta) * k;
        V₂(y) = SP₁(y) + sin( Ortho_Theta) * k;
        /* Sum each side separately */
        Sum1 = Sum1 + abs|intensity( SP₁(x, y)) - intensity( V₁(x, y))|;
        Sum2 = Sum2 + abs|intensity( SP₁(x, y)) - intensity( V₂(x, y))|;
    }
    Avg1 = Sum1 / number_of_snakelet_pts;
    Avg2 = Sum2 / number_of_snakelet_pts;
    if ( Avg1 > Threshold ) and ( Avg2 > Threshold ) then {
       the snakelet is a wrinkle candidate;
    }
}
```

Classification of Wrinkle-Candidates: Wrinkle Pattern Test

Finally, the snakelets that survive the steepness test, are analyzed for their group pattern, to ensure that there are enough of them and that they do not all lie on only one curve. First, it is verified that there are more than 5 snakelets. Next, for each pair of snakelets (there are a square number of pairs), the following is done. The line joining the snakelets is computed, and the average orientation for each of the two snakelets with respect to this line is computed. If the two orientations are either near parallel to the line, or if they satisfy the directional constraints that indicate they could belong to different curves.

FIGS. 16a and 16b illustrate a pictorial description of the Wrinkle Pattern test that shows how pairs of snakelets are judged as to whether they are part of a wrinkle. In FIG. 16a, the pairs are classed as not being reliable wrinkle patterns, as they both may belong to a single curve. In FIG. 16b the pairs are taken as appropriate evidence for a wrinkle pattern.Test.

Figure 17:
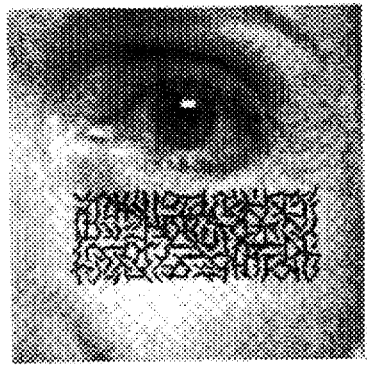
Figure 17:
Figure 17:
Figure 17:
Figure 17:
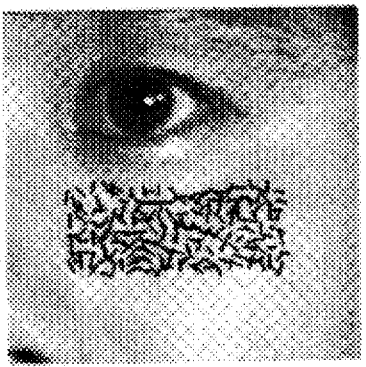
Figure 17:
Figure 17:
Figure 17:
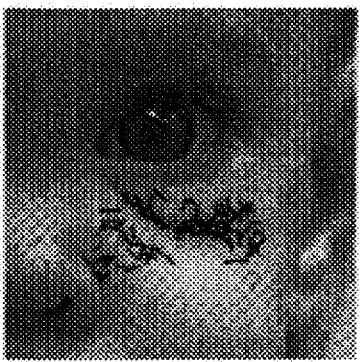
Figure 17:
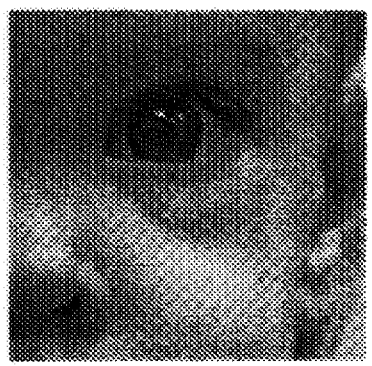

FIGS. 17a through 17c shows the outcomes of the wrinkle analysis process applied to a senior in the area beneath the image's right eye. FIGS. 17d through 17f shows the outcomes of the wrinkle analysis process applied to a young adult in the area beneath the image's right eye. FIGS. 17g through 17i shows the outcomes of the wrinkle analysis process applied to a baby in the area beneath the image's right eye. In FIGS. 17a, 17d and 17g, initial snakelets are dropped on the images. FIG. 17a illustrates these snakelets up close. FIGS. 17b, 17e, and 17h shows stabilized snakelets. FIGS. 17c, 17f and 17i shows the results of snakelets that survive the steepness test. Here only the senior data shown in FIG. 17c passes the Wrinkle Pattern Test.

Figure 18:
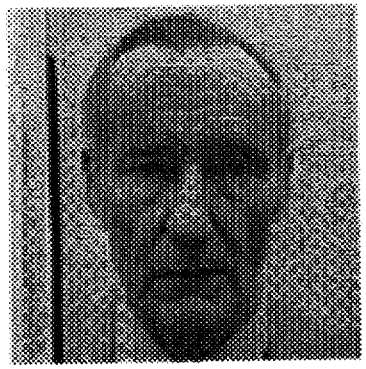
Figure 18:
Figure 18:
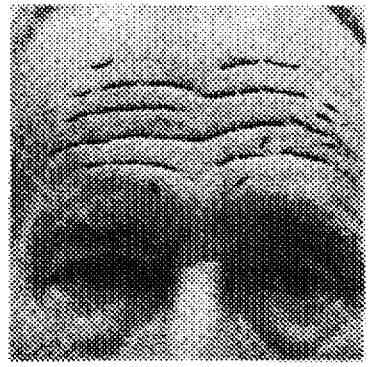
Figure 18:
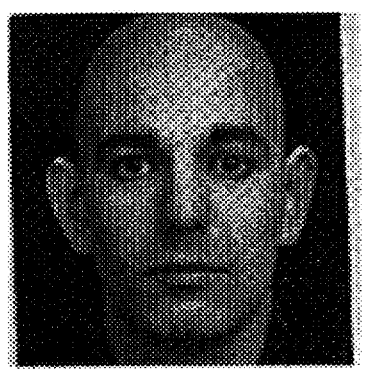
Figure 18:
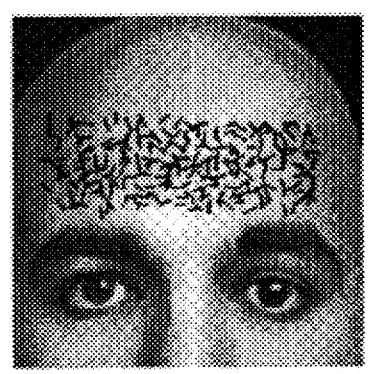
Figure 18:
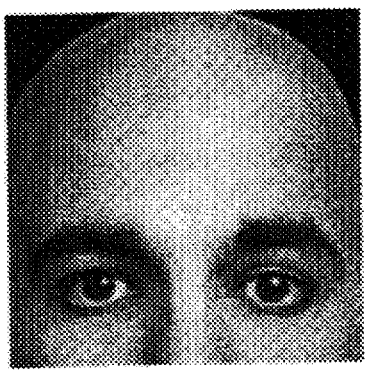
Figure 18:
Figure 18:
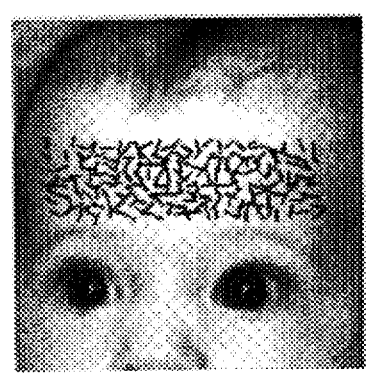
Figure 18:

FIGS. 18a through 18c shows the outcomes of the wrinkle analysis process applied to a senior in the area around the forehead. FIGS. 18d through 18f shows the outcomes of the wrinkle analysis process applied to a young adult in the area around the forehead. FIGS. 18g through 18i shows the outcomes of the wrinkle analysis process applied to a baby in the area around the forehead. FIGS. 18a, 18d and 18g shows the original image. FIGS. 18b, 18e and 18h shows stabilized snakelets. FIGS. 18c, 18f, and 18i shows the results of snakelets that facial scars, and dishevelled hair. Finally, an accurate estimation of the top of the skull may be able to be computed to aid in enhancing the accuracy of the age detection.

A facial image from a digital image can be determined from our process to be within approximately three years of an age categorization. For example, the baby categorization can be predetermined to be date of birth up to approximately three years of age. A child age classification can be approximately three years of age through approximately age twelve. A teenager age classification can be approximately age nineteen to age forty. An adult age categorization can be approximately age forty to approximately age sixty, and a senior age categorization can be approximately age sixty and up. The preferred embodiment described is only used for illustration purposes only, the specific age categorizations can be preselected as needed.

The invention described herein is intended to allow for a computer to automatically detect a single facial image from a digital image that includes extraneous facial and/or non-facial images, to at least the same degree as having a human to find a face in the digital image. Similarly, the invention can further allow for recognition of different facial expressions by a computer to at least the same degree as having a human interpret another person's facial expression.

Further, additional age related information can also be used to enhance facial feature confirmation. Additional information incorporated for age-based facial-finding, includes but is not limited to the growth of the nose and the nose-bridge, the relative shrinking of the iris-size over time, and changes to the outline of the face.

While the preferred embodiment describes detection of human faces, the invention is not limited to detection and recognition of only human faces. For example, the invention would be applicable to be used to detect and center in on other pre-programmed objects, such as but not limited to animals, plants, and artificial objects such as but not limited to automobiles and buildings. Thus, other reference ratios can be calculated and used for subsequent comparison.

The invention is not limited to detecting only from a digitized image. For example, an analog based image can be converted by well known analog to digital converters into a digitized image. Furthermore, the image can itself be based on any known method that quantifies the amount of light coming in at points in space, such as but not limited to pixel points.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A method of detecting facial features and classifying a human face from a two-dimensional digital image comprising the steps, executed by a computer, of:
   (a) detecting a two-dimensional digital image using a computer;
   (b) locating facial features representing a human face in the two-dimensional digital image by:
       (i) dropping preselected snakelet-curves onto the digital image;
       (ii) aligning the snakelet-curves and using a Hough Transform voting process to find the facial features in the digital image; and
   (c) classifying the located facial features of the human face into at least one of three age categories.

2. The method of detecting facial features and classifying of claim 1, wherein the locating step (b) further includes:
   finding an oval in the facial image;
   finding a chin in the image;
   finding sides of a face in the image;
   computing the virtual top of the head of the image;
   finding eyes in the image;

finding a mouth in the image; and finding a nose in the image.

3. The method of detecting facial features and classifying of claim 2, wherein the locating step (b) further includes:

(ii) aligning the snakelet-curves to the two-dimensional digital image, the snakelet-curves using a Hough Transform voting process to determine the chin and the sides of the face; and (iii) using a template on the two-dimensional digital image to determine the eyes, the mouth and the nose.

4. The method of detecting facial features and classifying of claim 1, wherein the classifying step (c) includes:

determining ratio values between each of the located facial features to a first level age group to determine whether the located human face is within the first level age group.

5. The method of detecting facial features and classifying of claim 4, wherein the classifying step (c) further includes:

locating wrinkles in the located human face by dropping and aligning snakelet-curves onto the digital image, the snakelet-curves using a Hough Transform voting process to locate the wrinkles; and comparing the wrinkles in the located human face to a second level age group to determine whether the located human face is within the second level age group.

6. The method of detecting facial features and classifying of claim 5, wherein the classifying step (c) further includes:

comparing the wrinkles in the located human face to a third level age group to determine whether the located human face is above the third level age group.

7. The method of detecting facial features and classifying of claim 1, wherein the classifying step (c) further includes:

each age category range approximately three years in length.

8. A method for automatically categorizing the age of facial images found in digital images using a computer, comprising the steps of:

(a) detecting a two-dimensional digital image by a computer vision system;

(b) locating facial features of a human face by:

(i) dropping and aligning first snakelet-curves to the digital image the snakeletcurves using a Hough Transform voting process to find recordable positions corresponding to a chin and sides of the human face;

(ii) using a template on the two-dimensional digital image to determine recordable positions to eyes, mouth and nose corresponding to the human face; and (c) classifying the recordable positions of the chin, the sides of the face, the eyes, the mouth, and the nose of the human face, into one of at least two age categories.

9. The method for automatically categorizing the age of facial images of claim 8, wherein the classifying step (c) further includes:

determining ratio values between each of the recordable positions to a first level age group to determine whether the human face is within the first level age group;

locating wrinkles in the human face by dropping and aligning second snakelet-curves onto the digital image, the second snakelet-curves using a Hough Transform voting process to locate the wrinkles; and comparing the wrinkles in the human face to a second level age group to determine whether the human face is within the second level age group.

10. The method for automatically categorizing the age of facial images of claim 8, wherein a first level age group includes:

an approximately three year age range.

11. The method for automatically categorizing the age of facial images of claim 10, wherein a second level age group includes:

an approximate range between age three and age forty.

12. The method for automatically categorizing the age of facial images of claim 11, further including:

comparing the wrinkles in the human face to a third level age group to determine whether the human face is above the second level age group.

13. The method for automatically categorizing the age of facial images of claim 8, wherein the classifying step (c) further includes:

each age category ranges approximately three years in length.

14. A computer vision detection system for detecting facial images in a two-dimensional digital image and categorizing age ranges of the detected facial image, comprising:

(a) a video-camera for creating a two-dimensional image containing digital data;

(b) a computer for reading the digital data to find facial features of a human face;

(c) a facial feature detection program, for execution in the computer for, dropping and aligning snakelet-curves to the digital image the first snakelet-curves using a Hough Transform voting process to find recordable positions corresponding to a chin and sides of a human face, using a template on the two-dimensional digital image to determine recordable positions to eyes, mouth and nose corresponding to the human face;

(d) a ratio program, for execution in the computer for determining ratio values between each of the recordable positions; and (e) a classification threshold program, for execution in the computer for, comparing the ratio values of the human face, to a preselected age category.

15. The computer vision detection system of claim 14, wherein the preselected age category further includes:

at least an age range of approximately three years.

* * * * *